US012348937B2

(12) United States Patent
Thomas et al.

(10) Patent No.: US 12,348,937 B2
(45) Date of Patent: Jul. 1, 2025

(54) AUDIO DEVICE AUTO-LOCATION

(71) Applicant: Dolby Laboratories Licensing Corporation, San Francisco, CA (US)

(72) Inventors: Mark R. P. Thomas, Walnut Creek, CA (US); Glenn Dickins, Como (AU); Alan Seefeldt, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 450 days.

(21) Appl. No.: 17/782,937

(22) PCT Filed: Dec. 17, 2020

(86) PCT No.: PCT/US2020/065769
§ 371 (c)(1),
(2) Date: Jun. 6, 2022

(87) PCT Pub. No.: WO2021/127286
PCT Pub. Date: Jun. 24, 2021

(65) Prior Publication Data

US 2023/0040846 A1 Feb. 9, 2023

Related U.S. Application Data

(60) Provisional application No. 62/992,068, filed on Mar. 19, 2020, provisional application No. 62/949,998, filed on Dec. 18, 2019.

(30) Foreign Application Priority Data

Dec. 18, 2019 (EP) .................................... 19217580

(51) Int. Cl.
*H04R 3/00* (2006.01)

(52) U.S. Cl.
CPC .................................... *H04R 3/005* (2013.01)

(58) Field of Classification Search
None
See application file for complete search history.

(56) References Cited

U.S. PATENT DOCUMENTS

| | | | |
|---|---|---|---|
| 6,574,339 | B1 | 6/2003 | Kim |
| 8,208,663 | B2 | 6/2012 | Jeong |

(Continued)

FOREIGN PATENT DOCUMENTS

| | | |
|---|---|---|
| CN | 105681968 A | 6/2016 |
| CN | 106339514 A | 1/2017 |

(Continued)

OTHER PUBLICATIONS

Fink, G. et al."Acoustic microphone geometry calibration: An overview and experimental evaluation of state-of-the-art algorithms" IEEE Signal Processing Society, Jul. 2016.

(Continued)

*Primary Examiner* — Duc Nguyen
*Assistant Examiner* — Assad Mohammed

(57) ABSTRACT

A method for estimating an audio device location in an environment may involve obtaining direction of arrival (DOA) data for each audio device of a plurality of audio devices in the environment and determining interior angles for each of a plurality of triangles based on the DOA data. Each triangle may have vertices that correspond with audio device locations. The method may involve determining a side length for each side of each of the triangles, performing a forward alignment process of aligning each of the plurality of triangles produce a forward alignment matrix and performing a reverse alignment process of aligning each of the plurality of triangles in a reverse sequence to produce a reverse alignment matrix. A final estimate of each audio (Continued)

device location may be based, at least in part, on values of the forward alignment matrix and values of the reverse alignment matrix.

17 Claims, 19 Drawing Sheets

(56) References Cited

U.S. PATENT DOCUMENTS

| | | | | |
|---|---|---|---|---|
| 9,031,268 | B2 | 5/2015 | Fejzo | |
| 9,086,475 | B2 | 7/2015 | Kleijn | |
| 9,264,806 | B2 | 2/2016 | Hyun | |
| 9,316,717 | B2 | 4/2016 | Gicklhorn | |
| 9,396,731 | B2 | 7/2016 | Herre | |
| 9,549,253 | B2 | 1/2017 | Alexandridis | |
| 10,506,361 | B1 | 12/2019 | Pallamsetty | |
| 2011/0316996 | A1 | 12/2011 | Abe | |
| 2014/0172435 | A1 | 6/2014 | Thiergart | |
| 2015/0016642 | A1 | 1/2015 | Walsh | |
| 2015/0117650 | A1 | 4/2015 | Jo | |
| 2016/0316309 | A1* | 10/2016 | Borss | G10L 19/008 |
| 2016/0322062 | A1 | 11/2016 | Li | |
| 2018/0165054 | A1 | 6/2018 | Kang | |
| 2018/0192223 | A1* | 7/2018 | Satheesh | H04S 7/301 |
| 2018/0249267 | A1 | 8/2018 | Klingler | |
| 2020/0411020 | A1* | 12/2020 | Laitinen | H04S 7/00 |

FOREIGN PATENT DOCUMENTS

| | | | |
|---|---|---|---|
| CN | 106658340 | A | 5/2017 |
| CN | 108141689 | A | 6/2018 |
| CN | 109952058 | A | 6/2019 |
| EP | 1206161 | A1 | 5/2002 |
| EP | 3148224 | A2 | 3/2017 |
| EP | 3032847 | B1 | 1/2020 |
| JP | 2005175744 | A | 6/2005 |
| JP | 2006148880 | A | 6/2006 |
| JP | 2017143357 | A | 8/2017 |
| JP | 2019168291 | A | 10/2019 |
| WO | 2014087277 | A1 | 6/2014 |
| WO | 2017039632 | A1 | 3/2017 |
| WO | 2018064410 | A1 | 4/2018 |
| WO | 19012131 | W | 1/2019 |

OTHER PUBLICATIONS

Fink, G. et al."Geometry calibration of distributed microphone arrays exploiting audio-visual correspondences" IEEE Conference in Lisbon, Portugal, Sep. 2014.

Plinger, A. et al."Passive Online Geometry Calibration of Acoustic Sensor Networks" IEEE Signal Processing Letters, vol. 24, No. 3, Mar. 2017, pp. 324-328.

* cited by examiner

100

1300b

AUDIO DEVICE AUTO-LOCATION

CROSS-REFERENCE TO RELATED APPLICATIONS

This application claims priority to United States Provisional Patent Application No. 62/949,998 filed 18 Dec. 2019, European Patent Application No. 19217580.0, filed 18 Dec. 2019, and U.S. Provisional Patent Application No. 62/992,068 filed 19 Mar. 2020, which are incorporated herein by reference.

BACKGROUND

Technical Field

This disclosure pertains to systems and methods for automatically locating audio devices.

Background

Audio devices, including but not limited to smart audio devices, have been widely deployed and are becoming common features of many homes. Although existing systems and methods for locating audio devices provide benefits, improved systems and methods would be desirable.

NOTATION AND NOMENCLATURE

Herein, we use the expression "smart audio device" to denote a smart device which is either a single purpose audio device or a virtual assistant (e.g., a connected virtual assistant). A single purpose audio device is a device (e.g., a smart speaker, a television (TV) or a mobile phone) including or coupled to at least one microphone (and which may in some examples also include or be coupled to at least one speaker) and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user-configured area.

Herein, a "virtual assistant" (e.g., a connected virtual assistant) is a device (e.g., a smart speaker, a smart display or a voice assistant integrated device) including or coupled to at least one microphone (and optionally also including or coupled to at least one speaker) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. Connected devices may form a sort of constellation, which may be managed by one main application which may be (or include or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed. The speaker feed may, in some instances, undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some such methods may involve audio device location, i.e. a method of determining a location of a plurality of (e.g. of at least four or more) audio devices in the environment. For example, some methods may involve obtaining direction of arrival (DOA) data for each audio device of a plurality of audio devices and determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix.

According to some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix. Some such methods may involve producing a rotation matrix based on the translated and scaled forward alignment matrix and the translated and scaled reverse alignment matrix. The rotation matrix may include a plurality of estimated audio device locations for each audio device. In some implementations, producing the rotation matrix may involve performing a singular value decomposition on the translated and scaled forward alignment matrix and the translated and scaled reverse alignment matrix. According to some examples, producing the final estimate of each audio device location may involve averaging the estimated audio device locations for each audio device to produce the final estimate of each audio device location.

In some implementations, determining the side length may involve determining a first length of a first side of a triangle and determining lengths of a second side and a third side of the triangle based on the interior angles of the triangle. Determining the first length may, in some examples, involve setting the first length to a predetermined value. Determining the first length may, in some examples, be based on time-of-arrival data and/or received signal strength data.

According to some examples, obtaining the DOA data may involve determining the DOA data for at least one audio device of the plurality of audio devices. In some instances, determining the DOA data may involve receiving microphone data from each microphone of a plurality of audio device microphones corresponding to a single audio device of the plurality of audio devices and determining the DOA data for the single audio device based, at least in part, on the microphone data. According to some examples, determining the DOA data may involve receiving antenna data from one or more antennas corresponding to a single audio device of the plurality of audio devices and determining the DOA data for the single audio device based, at least in part, on the antenna data.

In some implementations, the method also may involve controlling at least one of the audio devices based, at least in part, on the final estimate of at least one audio device location. In some such examples, controlling at least one of the audio devices may involve controlling a loudspeaker of at least one of the audio devices.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves audio device location. Some methods may involve obtaining DOA data for each audio device of a plurality of audio devices and determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix.

According to some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix. Some such methods may involve producing a rotation matrix based on the translated and scaled forward alignment matrix and the translated and scaled reverse alignment matrix. The rotation matrix may include a plurality of estimated audio device locations for each audio device. In some implementations, producing the rotation matrix may involve performing a singular value decomposition on the translated and scaled forward alignment matrix and the translated and scaled reverse alignment matrix. According to some examples, producing the final estimate of each audio device location may involve averaging the estimated audio device locations for each audio device to produce the final estimate of each audio device location.

In some implementations, determining the side length may involve determining a first length of a first side of a triangle and determining lengths of a second side and a third side of the triangle based on the interior angles of the triangle. Determining the first length may, in some examples, involve setting the first length to a predetermined value. Determining the first length may, in some examples, be based on time-of-arrival data and/or received signal strength data.

According to some examples, obtaining the DOA data may involve determining the DOA data for at least one audio device of the plurality of audio devices. In some instances, determining the DOA data may involve receiving microphone data from each microphone of a plurality of audio device microphones corresponding to a single audio device of the plurality of audio devices and determining the DOA data for the single audio device based, at least in part, on the microphone data. According to some examples, determining the DOA data may involve receiving antenna data from one or more antennas corresponding to a single audio device of the plurality of audio devices and determining the DOA data for the single audio device based, at least in part, on the antenna data.

In some implementations, the method also may involve controlling at least one of the audio devices based, at least in part, on the final estimate of at least one audio device location. In some such examples, controlling at least one of the audio devices may involve controlling a loudspeaker of at least one of the audio devices.

At least some aspects of the present disclosure may be implemented via apparatus. For example, one or more devices may be capable of performing, at least in part, the methods disclosed herein. In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some examples, the apparatus may be one of the above-referenced audio devices. However, in some implementations the apparatus may be another type of device, such as a mobile device, a laptop, a server, etc.

In some aspects of the present disclosure any of the methods describes may be implemented in a computer program product comprising instructions which, when the program is executed by a computer, cause the computer to carry out any of the methods or steps of the methods described in this disclosure.

In some aspect of the present disclosure, there is described a computer-readable medium comprising the computer program product.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
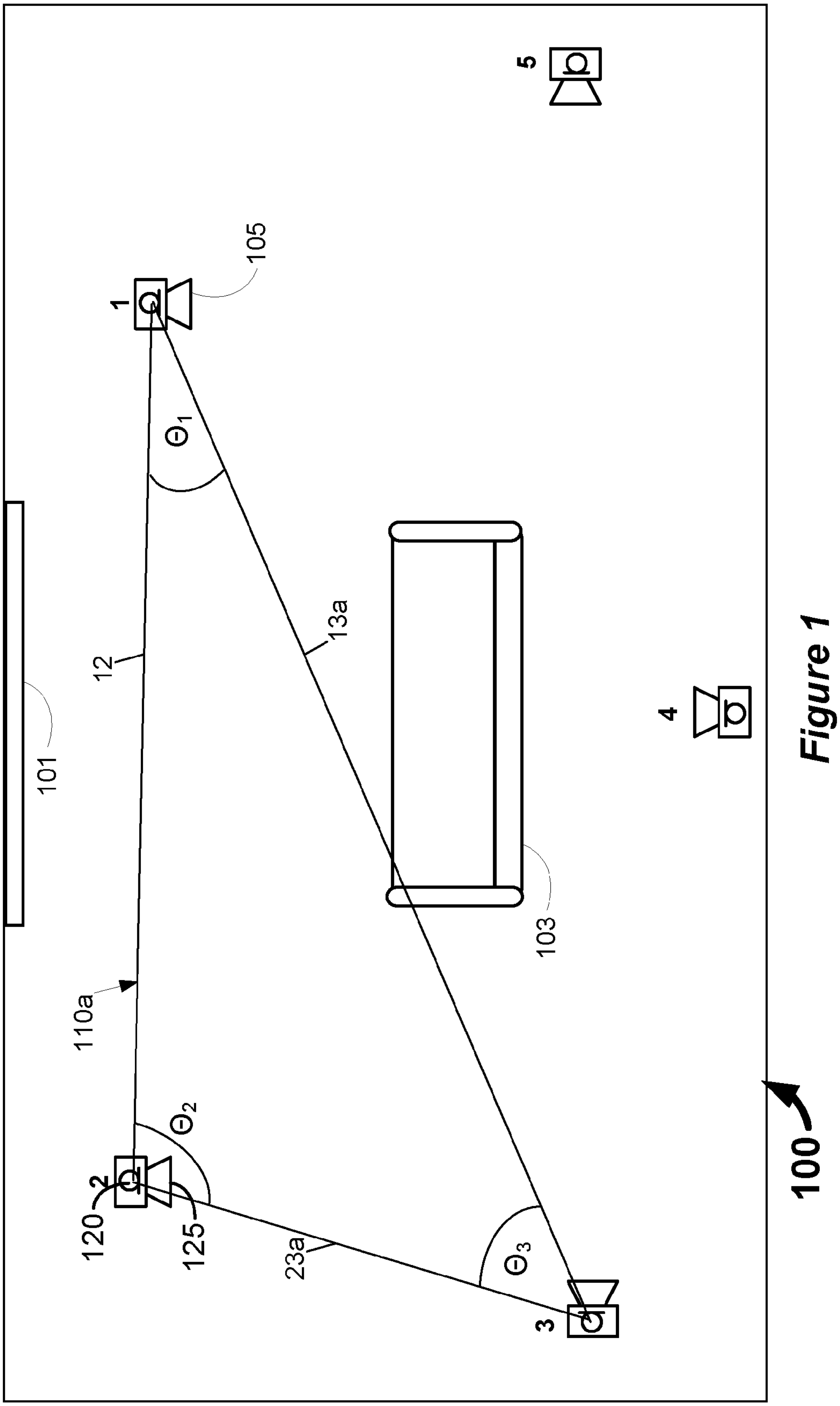
FIG. 1 shows an example of geometric relationships between three audio devices in an environment.

The advent of smart speakers, incorporating multiple drive units and microphone arrays, in addition to existing audio devices including televisions and sound bars, and new microphone and loudspeaker-enabled connected devices such as lightbulbs and microwaves, creates a problem in which dozens of microphones and loudspeakers need locating relative to one another in order to achieve orchestration. Audio devices cannot be assumed to lie in canonical layouts (such as a discrete Dolby 5.1 loudspeaker layout). In some instances, the audio devices in an environment may be randomly located, or at least may be distributed within the environment in an irregular and/or asymmetric manner.

Moreover, audio devices cannot be assumed to be heterogeneous or synchronous. As used herein, audio devices may be referred to as "synchronous" or "synchronized" if sounds are detected by, or emitted by, the audio devices according to the same sample clock, or synchronized sample clocks. For example, a first synchronized microphone of a first audio device within an environment may digitally sample audio data according to a first sample clock and a second microphone of a second synchronized audio device within the environment may digitally sample audio data according to the first sample clock. Alternatively, or additionally, a first synchronized speaker of a first audio device within an environment may emit sound according to a speaker set-up clock and a second synchronized speaker of a second audio device within the environment may emit sound according to the speaker set-up clock.

Some previously-disclosed methods for automatic speaker location require synchronized microphones and/or speakers. For example, some previously-existing tools for device localization rely upon sample synchrony between all microphones in the system, requiring known test stimuli and passing full-bandwidth audio data between sensors.

The present assignee has produced several speaker localization techniques for cinema and home that are excellent solutions in the use cases for which they were designed. Some such methods are based on time-of-flight derived from impulse responses between a sound source and microphone (s) that are approximately co-located with each loudspeaker. While system latencies in the record and playback chains may also be estimated, sample synchrony between clocks is required along with the need for a known test stimulus from which to estimate impulse responses.

Recent examples of source localization in this context have relaxed constraints by requiring intra-device microphone synchrony but not requiring inter-device synchrony. Additionally, some such methods relinquish the need for passing audio between sensors by low-bandwidth message passing such as via detection of the time of arrival (TOA) of a direct (non-reflected) sound or via detection of the dominant direction of arrival (DOA) of a direct sound. Each approach has some potential advantages and potential drawbacks. For example, TOA methods can determine device geometry up to an unknown translation, rotation, and reflection about one of three axes. Rotations of individual devices are also unknown if there is just one microphone per device. DOA methods can determine device geometry up to an unknown translation, rotation, and scale. While some such methods may produce satisfactory results under ideal conditions, the robustness of such methods to measurement error has not been demonstrated.

Some implementations of the present disclosure automatically locate the positions of multiple audio devices in an environment (e.g., in a room) by applying a geometrically-based optimization using asynchronous DOA estimates from uncontrolled sound sources observed by a microphone array in each device. Various disclosed audio device location approaches have proven to be robust to large DOA estimation errors.

Some such implementations involve iteratively aligning triangles derived from sets of DOA data. In some such examples, each audio device may contain a microphone array that estimates DOA from an uncontrolled source. In some implementations, microphone arrays may be collocated with at least one loudspeaker. However, at least some disclosed methods generalize to cases in which not all microphone arrays are collocated with a loudspeaker.

According to some disclosed methods, DOA data from every audio device to every other audio device in an environment may be aggregated. The audio device locations may be estimated by iteratively aligning triangles parameterized by pairs of DOAs. Some such methods may yield a result that is correct up to an unknown scale and rotation. In many applications, absolute scale is unnecessary, and rotations can be resolved by placing additional constraints on the solution. For example, some multi-speaker environments may include television (TV) speakers and a couch positioned for TV viewing. After locating the speakers in the environment, some methods may involve finding a vector pointing to the TV and locating the speech of a user sitting on the couch by triangulation. Some such methods may then involve having the TV emit a sound from its speakers and/or prompting the user to walk up to the TV and locating the user's speech by triangulation. Some implementations may involve rendering an audio object that pans around the environment. A user may provide user input (e.g., saying "Stop") indicating when the audio object is in one or more predetermined positions within the environment, such as the front of the environment, at a TV location of the environment, etc. According to some such examples, after locating the speakers within an environment and determining their orientation, the user may be located by finding the intersection of directions of arrival of sounds emitted by multiple speakers. Some implementations involve determining an estimated distance between at least two audio devices and scaling the distances between other audio devices in the environment according to the estimated distance.

FIG. 1 shows an example of geometric relationships between three audio devices in an environment. In this example, the environment 100 is a room that includes a television 101, a sofa 105 and five audio devices 105. According to this example, the audio devices 105 are in locations 1 through 5 of the environment 100. In this implementation, each of the audio devices 105 includes a microphone system 120 having at least three microphones and a speaker system 125 that includes at least one speaker. In some implementations, each microphone system 120 includes an array of microphones. According to some implementations, each of the audio devices 105 may include an antenna system that includes at least three antennas.

As with other examples disclosed herein, the type, number and arrangement of elements shown in FIG. 1 are merely made by way of example. Other implementations may have different types, numbers and arrangements of elements, e.g., more or fewer audio devices 105, audio devices 105 in different locations, etc.

In this example, the triangle 110*a* has its vertices at locations 1, 2 and 3. Here, the triangle 110*a* has sides 12, 23*a* and 13*a*. According to this example, the angle between sides 12 and 23 is $\theta_2$, the angle between sides 12 and 13*a* is $\theta_1$ and the angle between sides 23*a* and 13*a* is $\theta_3$. These angles may be determined according to DOA data, as described in more detail below.

In some implementations, only the relative lengths of triangle sides may be determined. In alternative implementations, the actual lengths of triangle sides may be estimated. According to some such implementations, the actual length of a triangle side may be estimated according to TOA data, e.g., according to the time of arrival of sound produced by an audio device located at one triangle vertex and detected by an audio device located at another triangle vertex. Alternatively, or additionally, the length of a triangle side may be estimated according to electromagnetic waves produced by an audio device located at one triangle vertex and detected by an audio device located at another triangle vertex. For example, the length of a triangle side may be estimated according to the signal strength of electromagnetic waves produced by an audio device located at one triangle vertex and detected by an audio device located at another triangle vertex. In some implementations, the length of a triangle side may be estimated according to a detected phase shift of electromagnetic waves.

Figure 2:
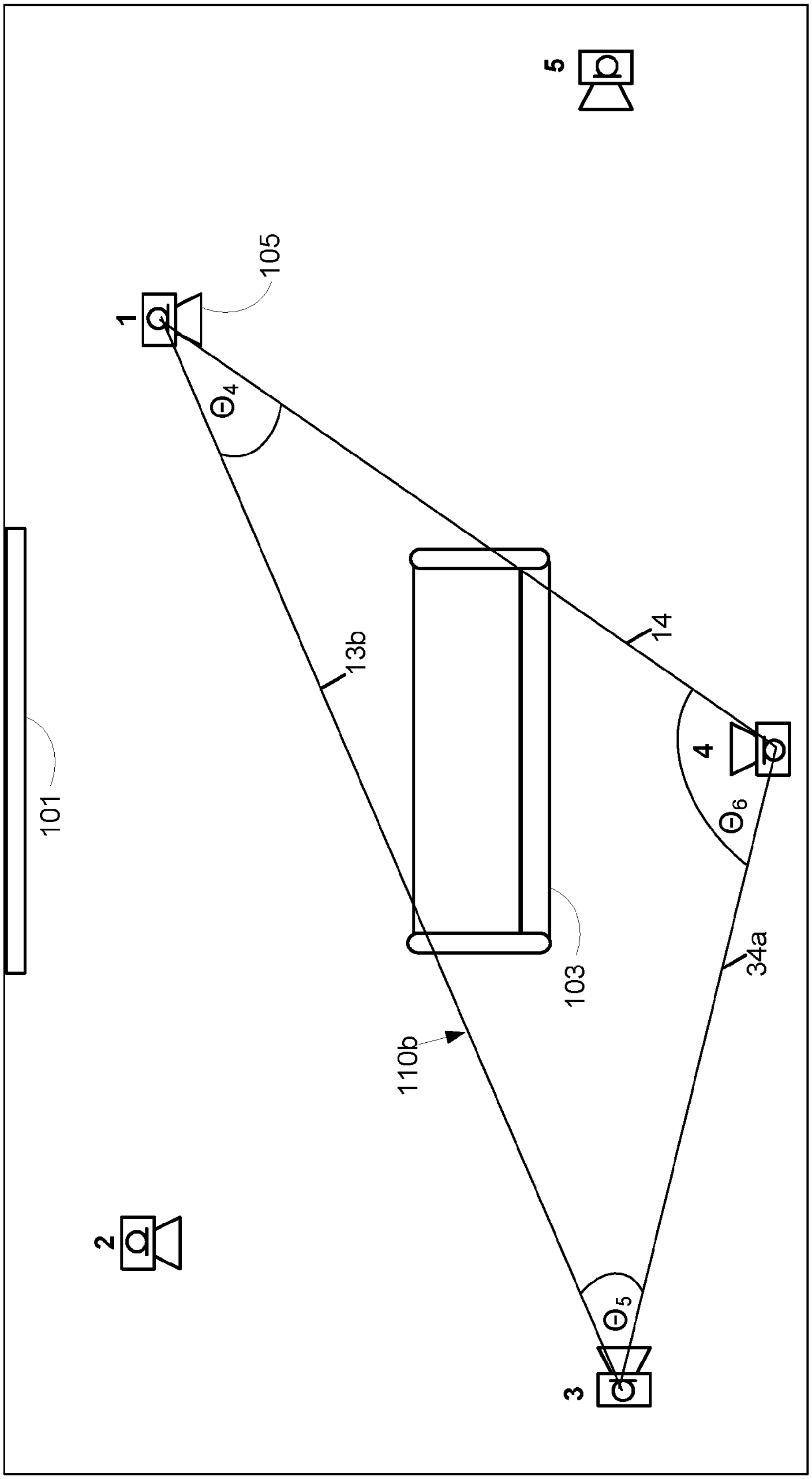
FIG. 2 shows another example of geometric relationships between three audio devices in the environment shown in FIG. 1.

FIG. 2 shows another example of geometric relationships between three audio devices in the environment shown in FIG. 1. In this example, the triangle 110*b* has its vertices at locations 1, 3 and 4. Here, the triangle 110*b* has sides 13*b*, 14 and 34*a*. According to this example, the angle between sides 13*b* and 14 is $\theta_4$, the angle between sides 13*b* and 34*a* is $\theta_5$ and the angle between sides 34*a* and 14 is $\theta_6$.

By comparing FIGS. 1 and 2, one may observe that the length of side 13*a* of triangle 110*a* should equal the length of side 13*b* of triangle 110*b*. In some implementations, the side lengths of one triangle (e.g., triangle 110*a*) may be assumed to be correct, and the length of a side shared by an adjacent triangle will be constrained to this length.

Figure 3A:
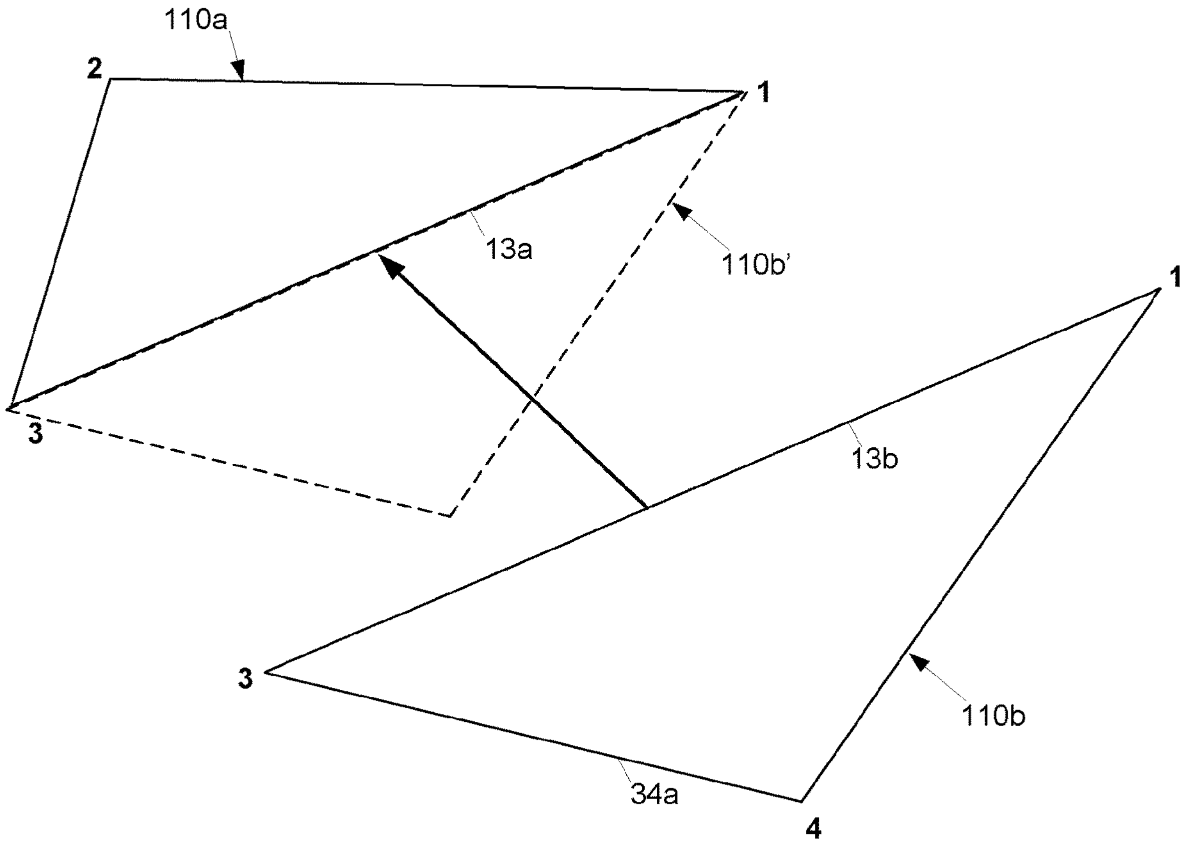
FIG. 3A shows both of the triangles depicted in FIGS. 1 and 2, without the corresponding audio devices and the other features of the environment.

FIG. 3A shows both of the triangles depicted in FIGS. 1 and 2, without the corresponding audio devices and the other features of the environment. FIG. 3 shows estimates of the side lengths and angular orientations of triangles 110*a* and 110*b*. In the example shown in FIG. 3A, the length of side 13*b* of triangle 110*b* is constrained to be the same length as side 13*a* of triangle 110*a*. The lengths of the other sides of triangle 110*b* are scaled in proportion to the resulting change in the length of side 13*b*. The resulting triangle 110*b*' is shown in FIG. 3A, adjacent to the triangle 110*a*.

According to some implementations, the side lengths of other triangles adjacent to triangle 110*a* and 110*b* may be all determined in a similar fashion, until all of the audio device locations in the environment 100 have been determined.

Some examples of audio device location may proceed as follows. Each audio device may report the DOA of every other audio device in an environment (e.g., a room) based on sounds produced by every other audio device in the environment. The Cartesian coordinates of the ith audio device may be expressed as $x_i=[x_i,y_i]^T$, where the superscript T indicates a vector transpose. Given M audio devices in the environment, i={1 . . . M}.

Figure 3B:
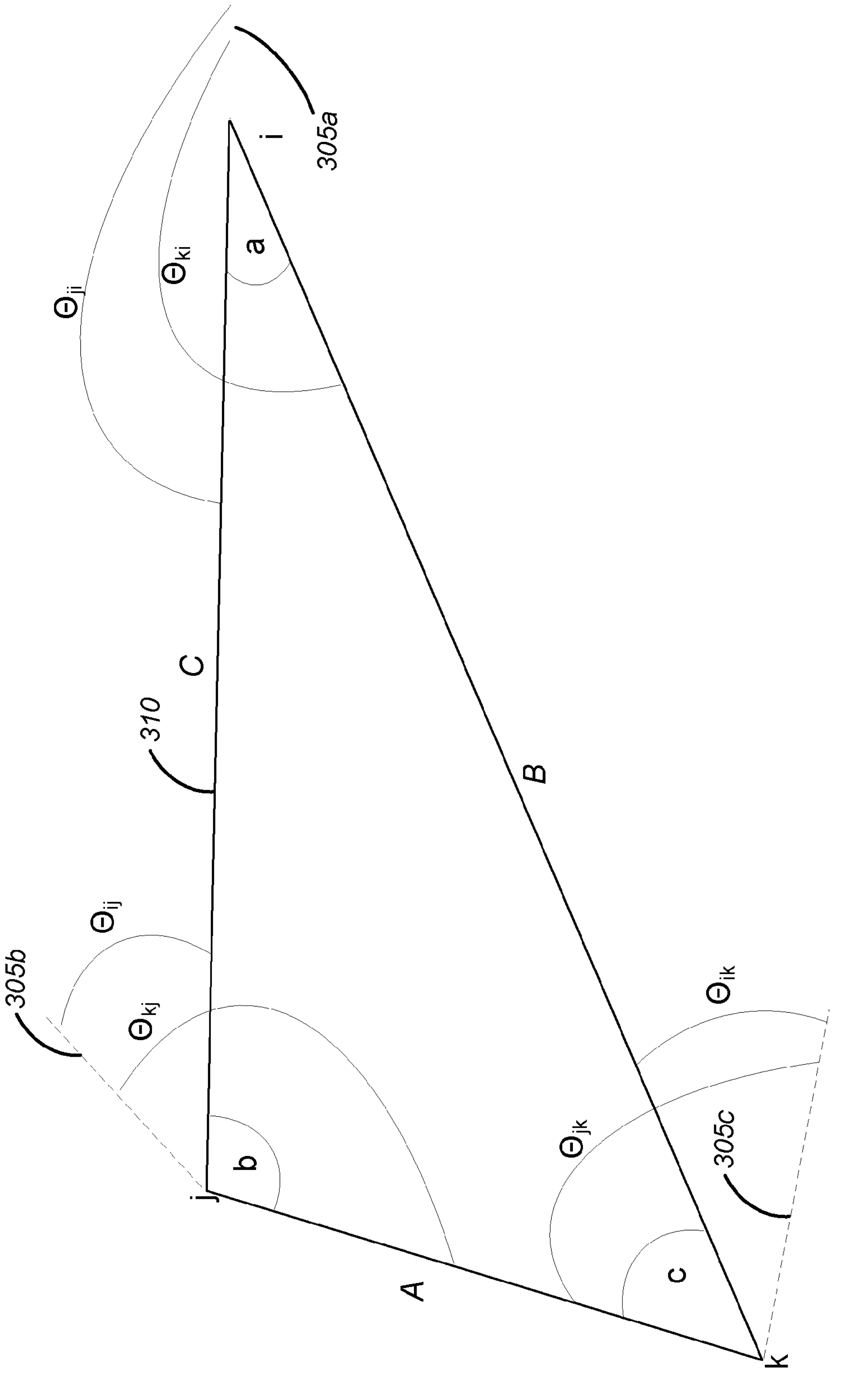
FIG. 3B shows an example of estimating the interior angles of a triangle formed by three audio devices.

FIG. 3B shows an example of estimating the interior angles of a triangle formed by three audio devices. In this example, the audio devices are i, j and k. The DOA of a sound source emanating from device j as observed from device i may be expressed as $\theta_{bi}$. The DOA of a sound source emanating from device k as observed from device i may be expressed as $\theta_{ki}$. In the example shown in FIG. 3B, $\theta_{ji}$ and $\theta_{ki}$ are measured from axis 305*a*, the orientation of which is arbitrary and which may, for example, correspond to the orientation of audio device i. Interior angle α of triangle 310 may be expressed as $\alpha=\theta_{ki}-\theta_{bi}$. One may observe that the calculation of interior angle α does not depend on the orientation of the axis 305*a*.

In the example shown in FIG. 3B, $\theta_{ij}$ and $\theta_{kj}$ are measured from axis 305*b*, the orientation of which is arbitrary and which may correspond to the orientation of audio device j. Interior angle b of triangle 310 may be expressed as $b=\theta_{ij}-\theta_{ki}$. Similarly, $\theta_{jk}$ and $\theta_{ik}$ are measured from axis 305*c* in this example Interior angle c of triangle 310 may be expressed as $c=\theta_{jk}-\theta_{ik}$.

In the presence of measurement error, a+b+c≠180°. Robustness can be improved by predicting each angle from the other two angles and averaging, e.g., as follows:

$$\tilde{\alpha}=0.5(\alpha+\text{sgn}(a)(180-|b+c|)).$$

In some implementations, the edge lengths (A, B, C) may be calculated (up to a scaling error) by applying the sine rule. In some examples, one edge length may be assigned an arbitrary value, such as 1. For example, by making A=1 and placing vertex $\hat{x}_a=[0,0]^T$ at the origin, the locations of the remaining two vertices may be calculated as follows:

$$\hat{x}_b=[A\cos\alpha,-A\sin\alpha]^T,\hat{x}_c=[B,0]^T$$

However, an arbitrary rotation may be acceptable.

According to some implementations, the process of triangle parameterization may be repeated for all possible subsets of three audio devices in the environment, enumerated in superset ζ of size $$N=\binom{M}{3}.$$

In some examples, $T_l$ may represent the lth triangle. Depending on the implementation, triangles may not be enumerated in any particular order. The triangles may overlap and may not align perfectly, due to possible errors in the DOA and/or side length estimates.

Figure 4:
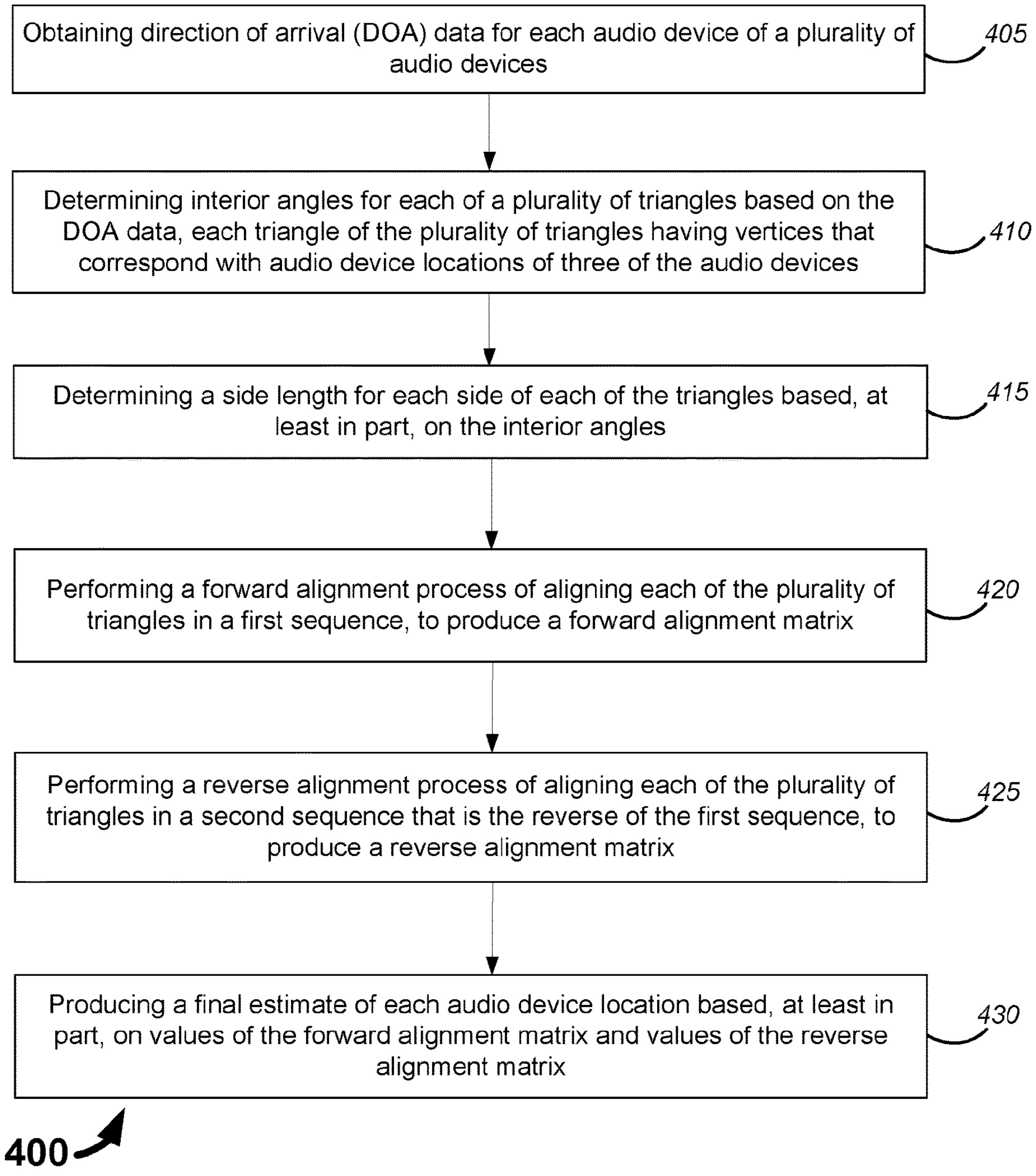
FIG. 4 is a flow diagram that outlines one example of a method that may be performed by an apparatus such as that shown in FIG. 11.
Figure 11:
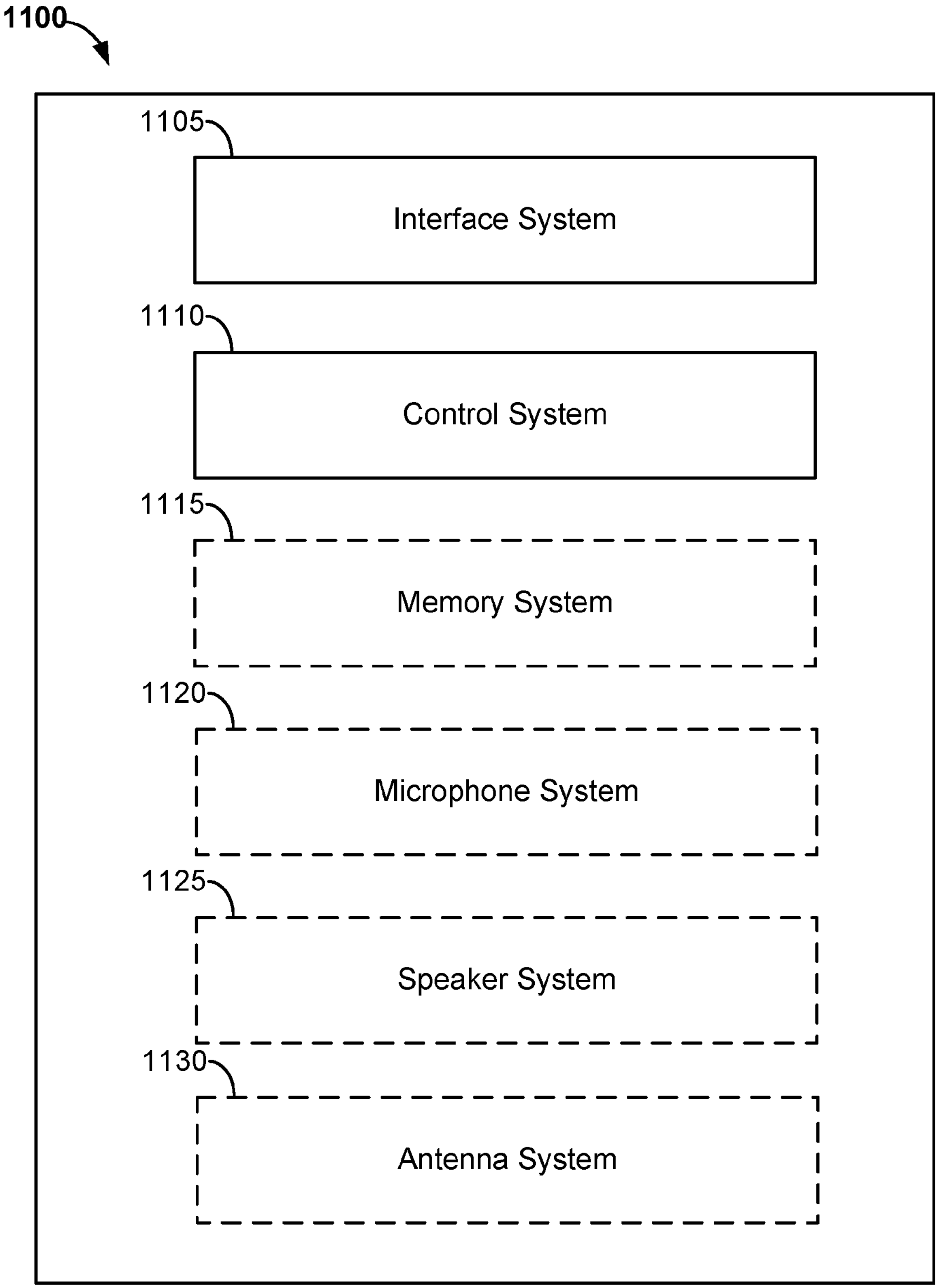
FIG. 11 is a block diagram that shows examples of components of an apparatus capable of implementing various aspects of this disclosure.

FIG. 4 is a flow diagram that outlines one example of a method that may be performed by an apparatus such as that shown in FIG. 11. The blocks of method 400, like other methods described herein, are not necessarily performed in the order indicated. Moreover, such methods may include more or fewer blocks than shown and/or described. In this implementation, method 400 involves estimating a speaker's location in an environment. The blocks of method 400 may be performed by one or more devices, which may be (or may include) the apparatus 1100 shown in FIG. 11.

In this example, block 405 involves obtaining direction of arrival (DOA) data for each audio device of a plurality of audio devices. In some examples, the plurality of audio devices may include all of the audio devices in an environment, such as all of the audio devices 105 shown in FIG. 1. However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to this example, block 410 involves determining interior angles for each of a plurality of triangles based on the DOA data. In this example, each triangle of the plurality of triangles has vertices that correspond with audio device locations of three of the audio devices. Some such examples are described above.

Figure 5:
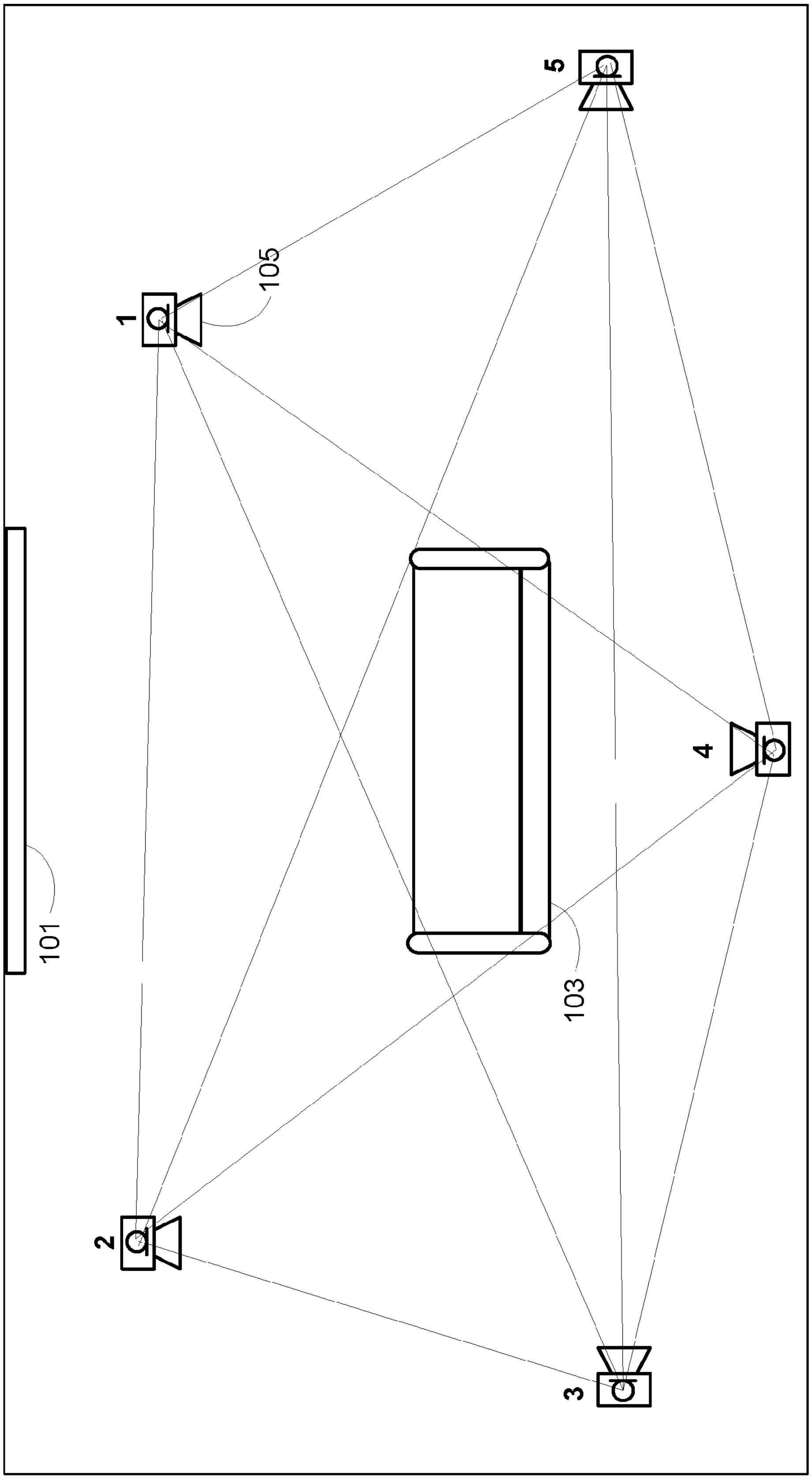
FIG. 5 shows an example in which each audio device in an environment is a vertex of multiple triangles.

FIG. 5 shows an example in which each audio device in an environment is a vertex of multiple triangles. The sides of each triangle correspond with distances between two of the audio devices 105.

In this implementation, block 415 involves determining a side length for each side of each of the triangles. (A side of a triangle may also be referred to herein as an "edge.") According to this example, the side lengths are based, at least in part, on the interior angles. In some instances, the side lengths may be calculated by determining a first length of a first side of a triangle and determining lengths of a second side and a third side of the triangle based on the interior angles of the triangle. Some such examples are described above.

According to some such implementations, determining the first length may involve setting the first length to a predetermined value. The lengths of the second and third sides may be then determined based on the interior angles of the triangle. All sides of the triangles may be determined based on the predetermined value, e.g. a reference value. In order to get actual distances (lengths) between the audio devices in the environment, a standardized scaling may be applied to the geometry resulting from the alignment processes described below with reference to blocks 420 and 425 of FIG. 4. This standardized scaling may include scaling the aligned triangles such that they fit a bounding shape, e.g. a circle, a polygon, etc., of a size corresponding to the environment. The size of the shape may be the size of a typical home environment or an arbitrary size suitable for the specific implementation. However, scaling the aligned triangles is not limited to fitting the geometry to a specific bounding shape, any other scaling criteria may be used which are suitable for the specific implementation.

In some examples, determining the first length may be based on time-of-arrival data and/or received signal strength data. The time-of-arrival data and/or received signal strength data may, in some implementations, correspond to sound waves from a first audio device in an environment that are detected by a second audio device in the environment. Alternatively, or additionally, the time-of-arrival data and/or received signal strength data may correspond to electromagnetic waves (e.g., radio waves, infrared waves, etc.) from a first audio device in an environment that are detected by a second audio device in the environment. When time-of-arrival data and/or received signal strength data are not available, the first length may be set to the predetermined value as described above.

According to this example, block 420 involves performing a forward alignment process of aligning each of the plurality of triangles in a first sequence. According to this example, the forward alignment process produces a forward alignment matrix.

According to some such examples, triangles are expected to align in such a way that an edge $(x_i, x_j)$ is equal to a neighboring edge, e.g., as shown in FIG. 3A and described above. Let £ be the set of all edges of size $$P = \binom{M}{2}.$$

In some such implementations, block 420 may involve traversing through ε and aligning the common edges of triangles in forward order by forcing an edge to coincide with that of a previously aligned edge.

Figure 6:
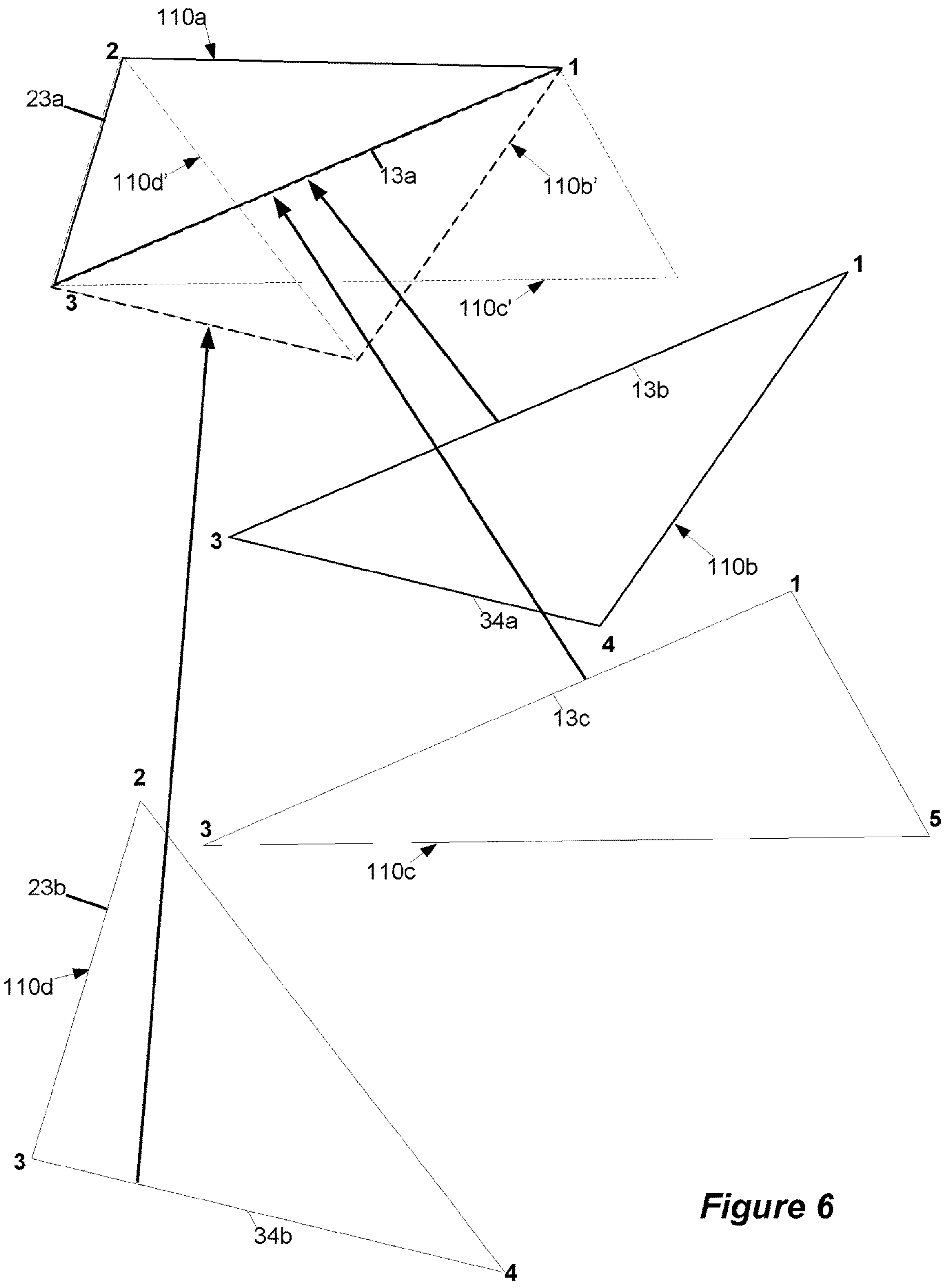
FIG. 6 provides an example of part of a forward alignment process.

FIG. 6 provides an example of part of a forward alignment process. The numbers 1 through 5 that are shown in bold in FIG. 6 correspond with the audio device locations shown in FIGS. 1, 2 and 5. The sequence of the forward alignment process that is shown in FIG. 6 and described herein is merely an example.

In this example, as in FIG. 3A, the length of side 13*b* of triangle 110*b* is forced to coincide with the length of side 13*a* of triangle 110*a*. The resulting triangle 110*b*' is shown in FIG. 6, with the same interior angles maintained. According to this example, the length of side 13*c* of triangle 110*c* is also forced to coincide with the length of side 13*a* of triangle 110*a*. The resulting triangle 110*c*' is shown in FIG. 6, with the same interior angles maintained.

Next, in this example, the length of side 34*b* of triangle 110*d* is forced to coincide with the length of side 34*a* of triangle 110*b*'. Moreover, in this example, the length of side 23*b* of triangle 110*d* is forced to coincide with the length of side 23*a* of triangle 110*a*. The resulting triangle 110*d*' is shown in FIG. 6, with the same interior angles maintained. According to some such examples, the remaining triangles shown in FIG. 5 may be processed in the same manner as triangles 110*b*, 110*c* and 110*d*.

The results of the forward alignment process may be stored in a data structure. According to some such examples, the results of the forward alignment process may be stored in a forward alignment matrix. For example, the results of the forward alignment process may be stored in matrix $\vec{X} \in \mathbb{R}^{3N \times 2}$, where N indicates the total number of triangles.

When the DOA data and/or the initial side length determinations contain errors, multiple estimates of audio device location will occur. The errors will generally increase during the forward alignment process.

Figure 7:
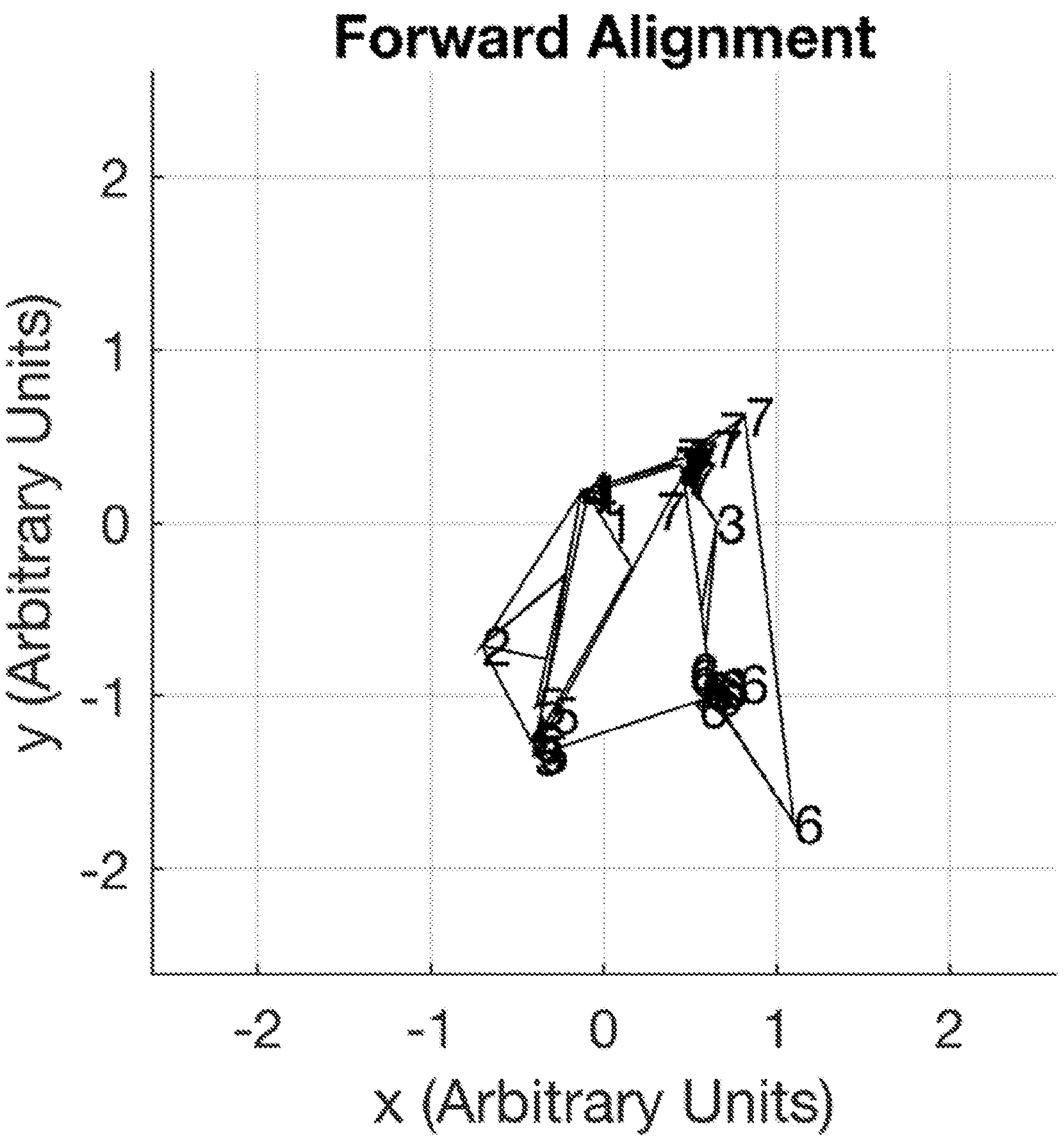
FIG. 7 shows an example of multiple estimates of audio device location that have occurred during a forward alignment process.

FIG. 7 shows an example of multiple estimates of audio device location that have occurred during a forward alignment process. In this example, the forward alignment process is based on triangles having seven audio device locations as their vertices. Here, the triangles do not align perfectly due to additive errors in the DOA estimates. The locations of the numbers 1 through 7 that are shown in FIG. 7 correspond to the estimated audio device locations produced by the forward alignment process. In this example, the audio device location estimates labelled "1" coincide but the audio device locations estimates for audio devices 6 and 7 show larger differences, as indicted by the relatively larger areas over which the numbers 6 and 7 are located.

Returning to FIG. 4, in this example block 425 involves a reverse alignment process of aligning each of the plurality of triangles in a second sequence that is the reverse of the first sequence. According to some implementations, the reverse alignment process may involve traversing through E as before, but in reverse order. In alternative examples, the reverse alignment process may not be precisely the reverse of the sequence of operations of the forward alignment process. According to this example, the reverse alignment process produces a reverse alignment matrix, which may be represented herein as $\vec{X} \in \mathbb{R}^{3N \times 2}$.

Figure 8:
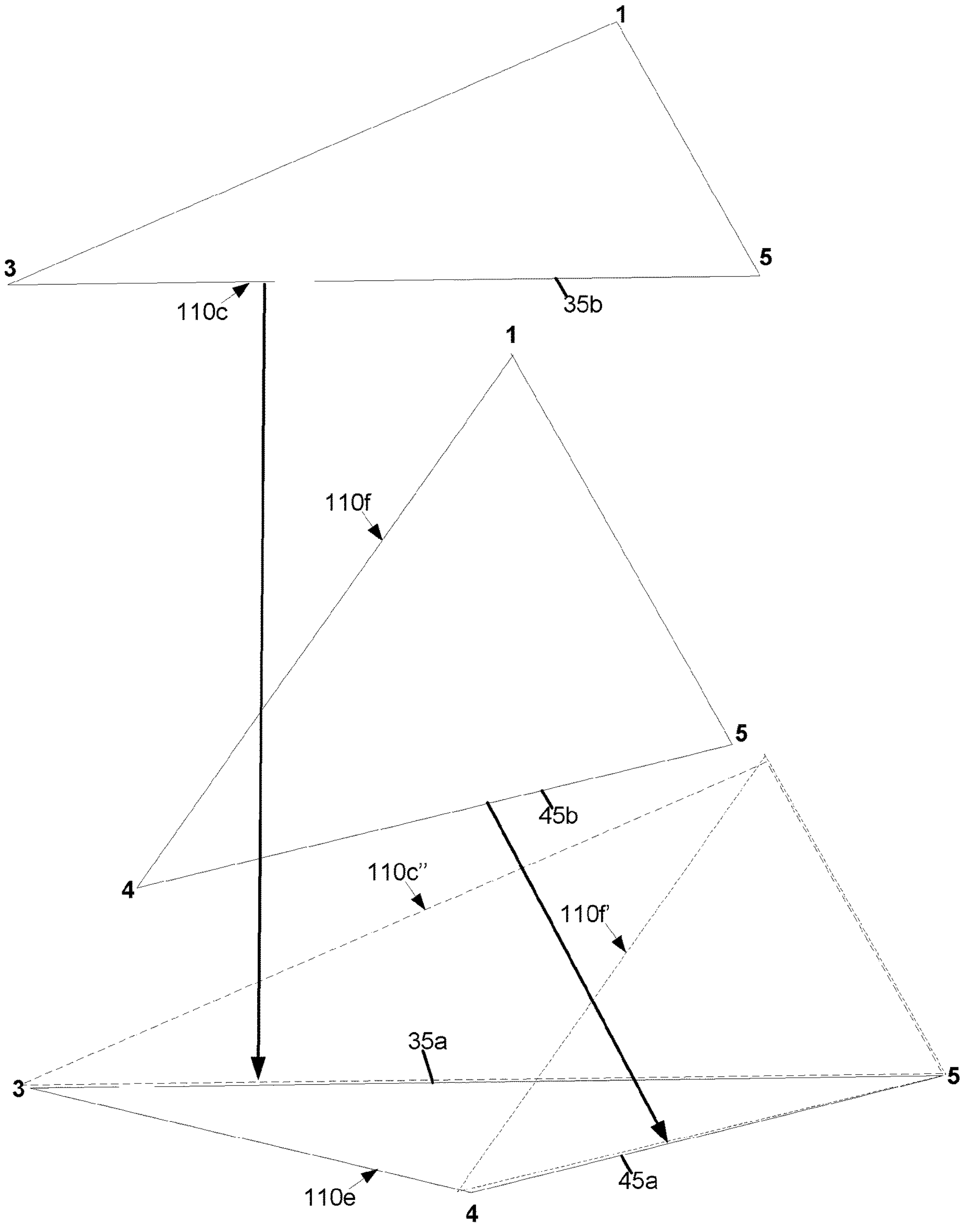
FIG. 8 provides an example of part of a reverse alignment process.

FIG. 8 provides an example of part of a reverse alignment process. The numbers 1 through 5 that are shown in bold in FIG. 8 correspond with the audio device locations shown in FIGS. 1, 2 and 5. The sequence of the reverse alignment process that is shown in FIG. 8 and described herein is merely an example.

In the example shown in FIG. 8, triangle 110*e* is based on audio device locations 3, 4 and 5. In this implementation, the side lengths (or "edges") of triangle 110*e* are assumed to be correct, and the side lengths of adjacent triangles are forced to coincide with them. According to this example, the length of side 45*b* of triangle 110*f* is forced to coincide with the length of side 45*a* of triangle 110*e*. The resulting triangle 110*f*', with interior angles remaining the same, is shown in FIG. 8. In this example, the length of side 35*b* of triangle 110*c* is forced to coincide with the length of side 35*a* of triangle 110*e*. The resulting triangle 110*c*", with interior angles remaining the same, is shown in FIG. 8. According to some such examples, the remaining triangles shown in FIG. 5 may be processed in the same manner as triangles 110*c* and 110*f*, until the reverse alignment process has included all remaining triangles.

Figure 9:
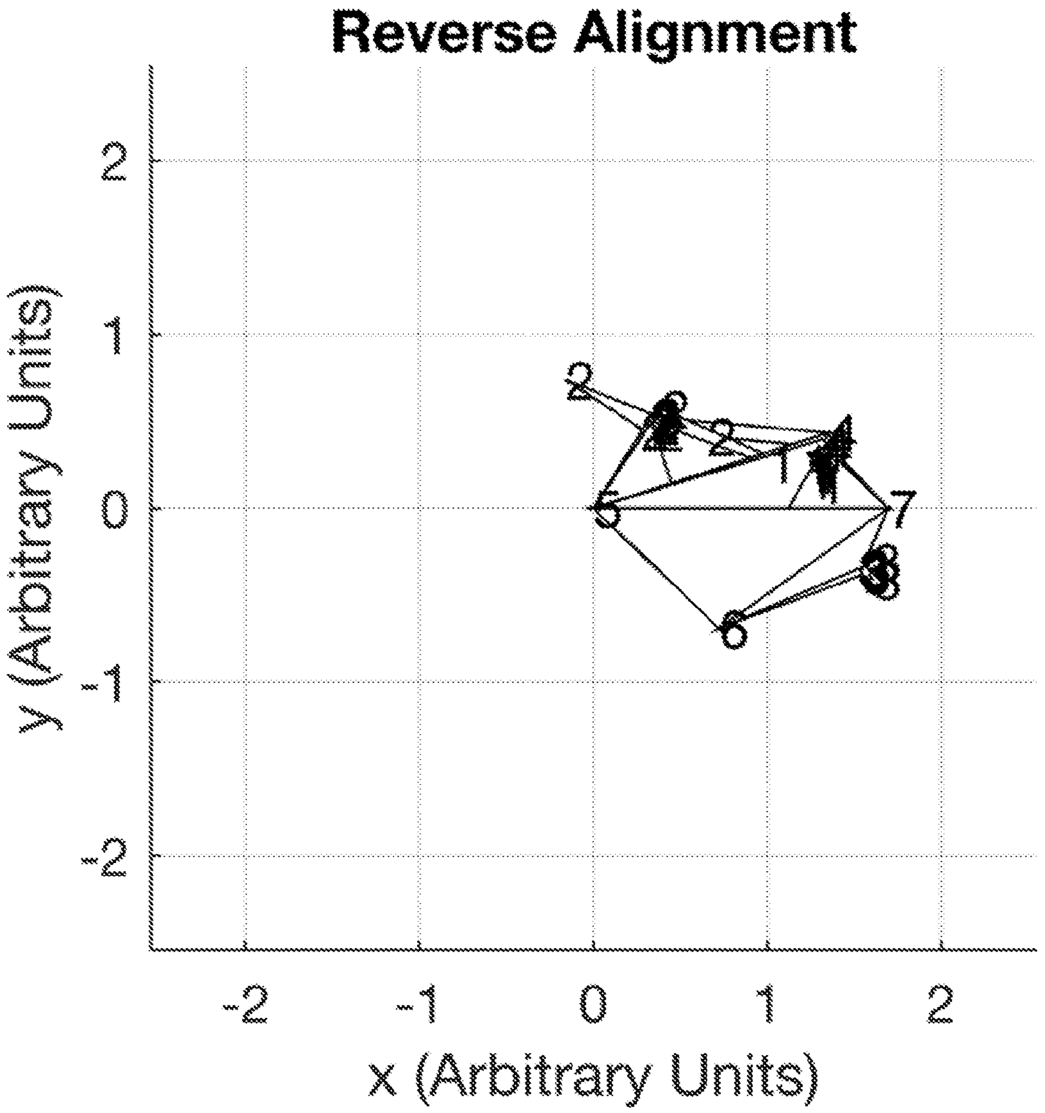
FIG. 9 shows an example of multiple estimates of audio device location that have occurred during a reverse alignment process.

FIG. 9 shows an example of multiple estimates of audio device location that have occurred during a reverse alignment process. In this example, the reverse alignment process is based on triangles having the same seven audio device locations as their vertices that are described above with reference to FIG. 7. The locations of the numbers 1 through 7 that are shown in FIG. 9 correspond to the estimated audio device locations produced by the reverse alignment process. Here again, the triangles do not align perfectly due to additive errors in the DOA estimates. In this example, the audio device location estimates labelled 6 and 7 coincide, but the audio device location estimates for audio devices 1 and 2 show larger differences.

Returning to FIG. 4, block 430 involves producing a final estimate of each audio device location based, at least in part, on values of the forward alignment matrix and values of the reverse alignment matrix. In some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix.

For example, translation and scaling are fixed by moving the centroids to the origin and forcing unit Frobenius norm, e.g., $\vec{\bar{\mathbf{X}}}=\vec{X}/\|\vec{X}\|_2{}^F$ and $\overleftarrow{\bar{\mathbf{X}}}=\overleftarrow{\bar{\mathbf{X}}}/\|\overleftarrow{\bar{\mathbf{X}}}\|_2{}^F$.

According to some such examples, producing the final estimate of each audio device location also may involve producing a rotation matrix based on the translated and scaled forward alignment matrix and the translated and scaled reverse alignment matrix. The rotation matrix may include a plurality of estimated audio device locations for each audio device. An optimal rotation between forward and reverse alignments is can be found, for example, by singular value decomposition. In some such examples, involve producing the rotation matrix may involve performing a singular value decomposition on the translated and scaled forward alignment matrix and the translated and scaled reverse alignment matrix, e.g., as follows:

$$U\Sigma V=\vec{\bar{\mathbf{X}}}^T\overleftarrow{\bar{\mathbf{X}}}$$

In the foregoing equation, U represents the left-singular vector and V represents the right-singular vector of matrix $\vec{\bar{\mathbf{X}}}^T\overleftarrow{\bar{\mathbf{X}}}$ respectively. E represents a matrix of singular values. The foregoing equation yields a rotation matrix $R=VU^T$. The matrix product $VU^T$ yields a rotation matrix such that $R\overleftarrow{\bar{\mathbf{X}}}$ is optimally rotated to align with $\vec{\bar{X}}$.

According to some examples, after determining the rotation matrix $R=VU^T$ alignments may be averaged, e.g., as follows:

$$\overleftrightarrow{\bar{\mathbf{X}}}=0.5(\vec{X}+R\overleftarrow{\bar{\mathbf{X}}}).$$

In some implementations, producing the final estimate of each audio device location also may involve averaging the estimated audio device locations for each audio device to produce the final estimate of each audio device location. Various disclosed implementations have proven to be robust, even when the DOA data and/or other calculations include significant errors. For example, $\overleftrightarrow{\bar{\mathbf{X}}}$ contains $$\frac{(N-1)(N-2)}{2},$$

i.e. multiple, estimates or the same node due to overlapping vertices from multiple triangles. Averaging across common nodes yields a final estimate $\hat{X}\in\mathbb{R}^{M\times 3}$.

Figure 10:
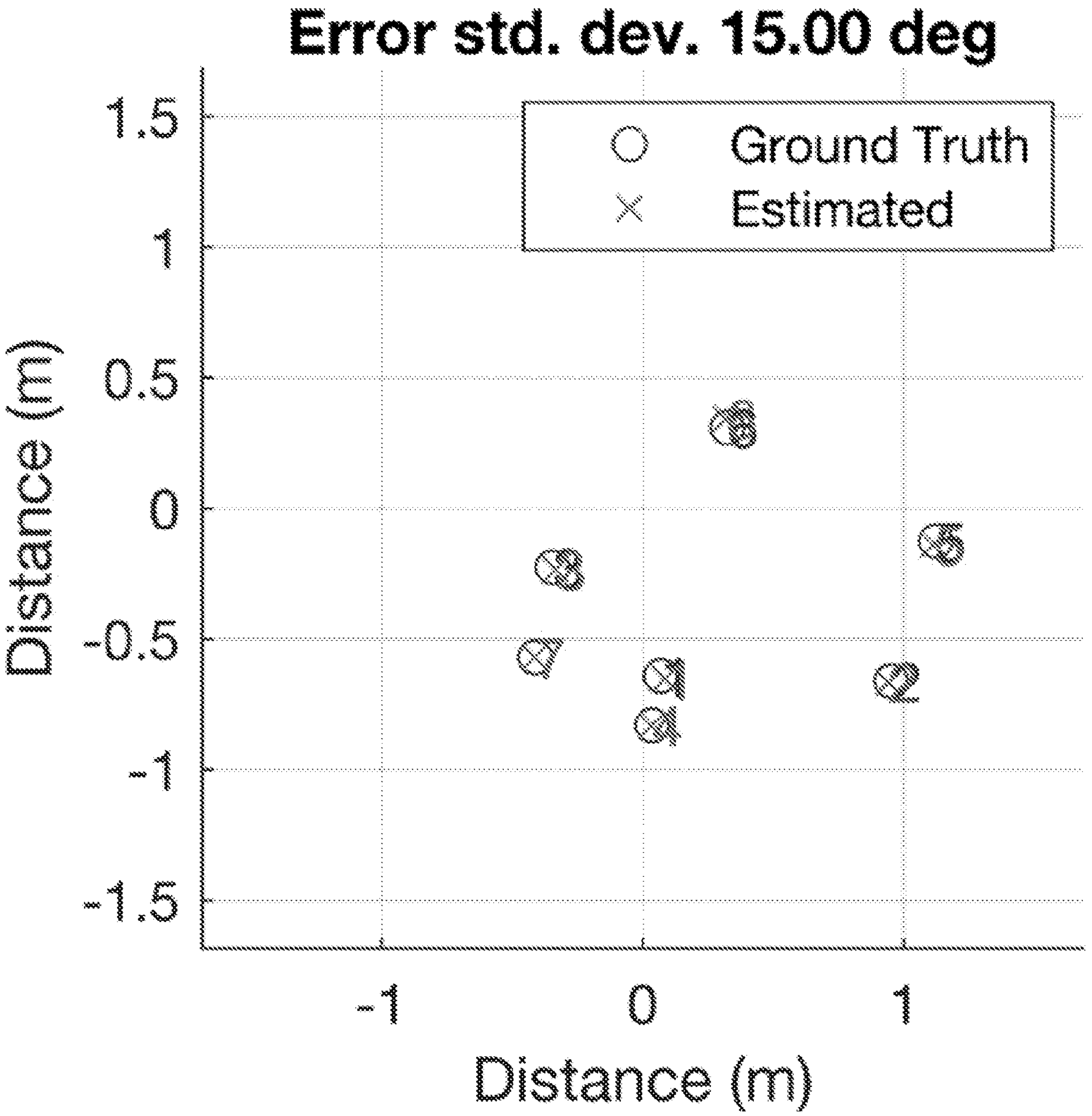
FIG. 10 shows a comparison of estimated and actual audio device locations.

FIG. 10 shows a comparison of estimated and actual audio device locations. In the example shown in FIG. 10, the audio device locations correspond to those that were estimated during the forward and reverse alignment processes that are described above with reference to FIGS. 7 and 9. In these examples, the errors in the DOA estimations had a standard deviation of 15 degrees. Nonetheless, the final estimates of each audio device location (each of which is represented by an "x" in FIG. 10) correspond well with the actual audio device locations (each of which is represented by a circle in FIG. 10). By performing a forward alignment process in a first sequence and a reverse alignment process in a second sequence reversed to the first sequence, errors/inaccuracies in the direction of arrival estimates (data) are averaged out, thereby reducing the overall error of estimates of audio devices locations in the environment. Errors tend to accumulate in the alignment sequence as shown in FIG. 7 (where larger vertex numbers show larger alignment spread) and FIG. 9 (where lower vertex numbers show larger spread). The process of traversing the sequence in the reverse order also reverses the alignment error, thereby averaging out the overall error in the final location estimate.

FIG. 11 is a block diagram that shows examples of components of an apparatus capable of implementing various aspects of this disclosure. According to some examples, the apparatus 1100 may be, or may include, a smart audio device (such as a smart speaker) that is configured for performing at least some of the methods disclosed herein. In other implementations, the apparatus 1100 may be, or may include, another device that is configured for performing at least some of the methods disclosed herein. In some such implementations the apparatus 1100 may be, or may include, a server.

In this example, the apparatus 1100 includes an interface system 1105 and a control system 1110. The interface system 1105 may, in some implementations, be configured for receiving input from each of a plurality of microphones in an environment. The interface system 1105 may include one or more network interfaces and/or one or more external device interfaces (such as one or more universal serial bus (USB) interfaces). According to some implementations, the interface system 1105 may include one or more wireless interfaces. The interface system 1105 may include one or more devices for implementing a user interface, such as one or more microphones, one or more speakers, a display system, a touch sensor system and/or a gesture sensor system. In some examples, the interface system 1105 may include one or more interfaces between the control system 1110 and a memory system, such as the optional memory system 1115 shown in FIG. 11. However, the control system 1110 may include a memory system.

The control system 1110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the control system 1110 may reside in more than one device. For example, a portion of the control system 1110 may reside in a device within the environment 100 that is depicted in FIG. 1, and another portion of the control system 1110 may reside in a device that is outside the environment 100, such as a server, a mobile device (e.g., a smartphone or a tablet computer), etc. The interface system 1105 also may, in some such examples, reside in more than one device.

In some implementations, the control system 1110 may be configured for performing, at least in part, the methods disclosed herein. According to some examples, the control system 1110 may be configured for implementing the methods described above, e.g., with reference to FIG. 4 and/or the methods described below with reference to FIG. 12 et seq. In some such examples, the control system 1110 may be configured for determining, based at least in part on output from the classifier, an estimate of each of a plurality of audio device locations within an environment.

In some examples, the apparatus 1100 may include the optional microphone system 1120 that is depicted in FIG. 11. The microphone system 1120 may include one or more microphones. In some examples, the microphone system 1120 may include an array of microphones. In some examples, the apparatus 1100 may include the optional speaker system 1125 that is depicted in FIG. 11. The speaker system 1125 may include one or more loudspeakers. In some examples, the microphone system 1120 may include an array of loudspeakers. In some such examples the apparatus 1100 may be, or may include, an audio device. For example, the apparatus 1100 may be, or may include, one of the audio devices 105 shown in FIG. 1.

In some examples, the apparatus 1100 may include the optional antenna system 1130 that is shown in FIG. 11. According to some examples, the antenna system 1130 may include an array of antennas. In some examples, the antenna system 1130 may be configured for transmitting and/or receiving electromagnetic waves. According to some implementations, the control system 1110 may be configured to estimate the distance between two audio devices in an environment based on antenna data from the antenna system 1130. For example, the control system 1110 may be configured to estimate the distance between two audio devices in an environment according to the time of arrival of the antenna data and/or the received signal strength of the antenna data.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 1115 shown in FIG. 11 and/or in the control system 1110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 1110 of FIG. 11.

Much of the foregoing discussion involves audio device auto-location. The following discussion expands upon some methods of determining listener location and listener angular orientation that are described briefly above. In the foregoing description, the term “rotation” is used in essentially the same way as the term “orientation” is used in the following description. For example, the above-referenced “rotation” may refer to a global rotation of the final speaker geometry, not the rotation of the individual triangles during the process that is described above with reference to FIG. 4 et seq. This global rotation or orientation may be resolved with reference to a listener angular orientation, e.g., by the direction in which the listener is looking, by the direction in which the listener’s nose is pointing, etc.

Various satisfactory methods for estimating listener location are known in the art, some of which are described below. However, estimating the listener angular orientation can be challenging. Some relevant methods are described in detail below.

Determining listener location and listener angular orientation can enable some desirable features, such as orienting located audio devices relative to the listener. Knowing the listener position and angular orientation allows a determination of, e.g., which speakers within an environment would be in the front, which are in the back, which are near the center (if any), etc., relative to the listener.

After making a correlation between audio device locations and a listener’s location and orientation, some implementations may involve providing the audio device location data, the audio device angular orientation data, the listener location data and the listener angular orientation data to an audio rendering system. Alternatively, or additionally, some implementations may involve an audio data rendering process that is based, at least in part, on the audio device location data, the audio device angular orientation data, the listener location data and the listener angular orientation data.

Figure 12:
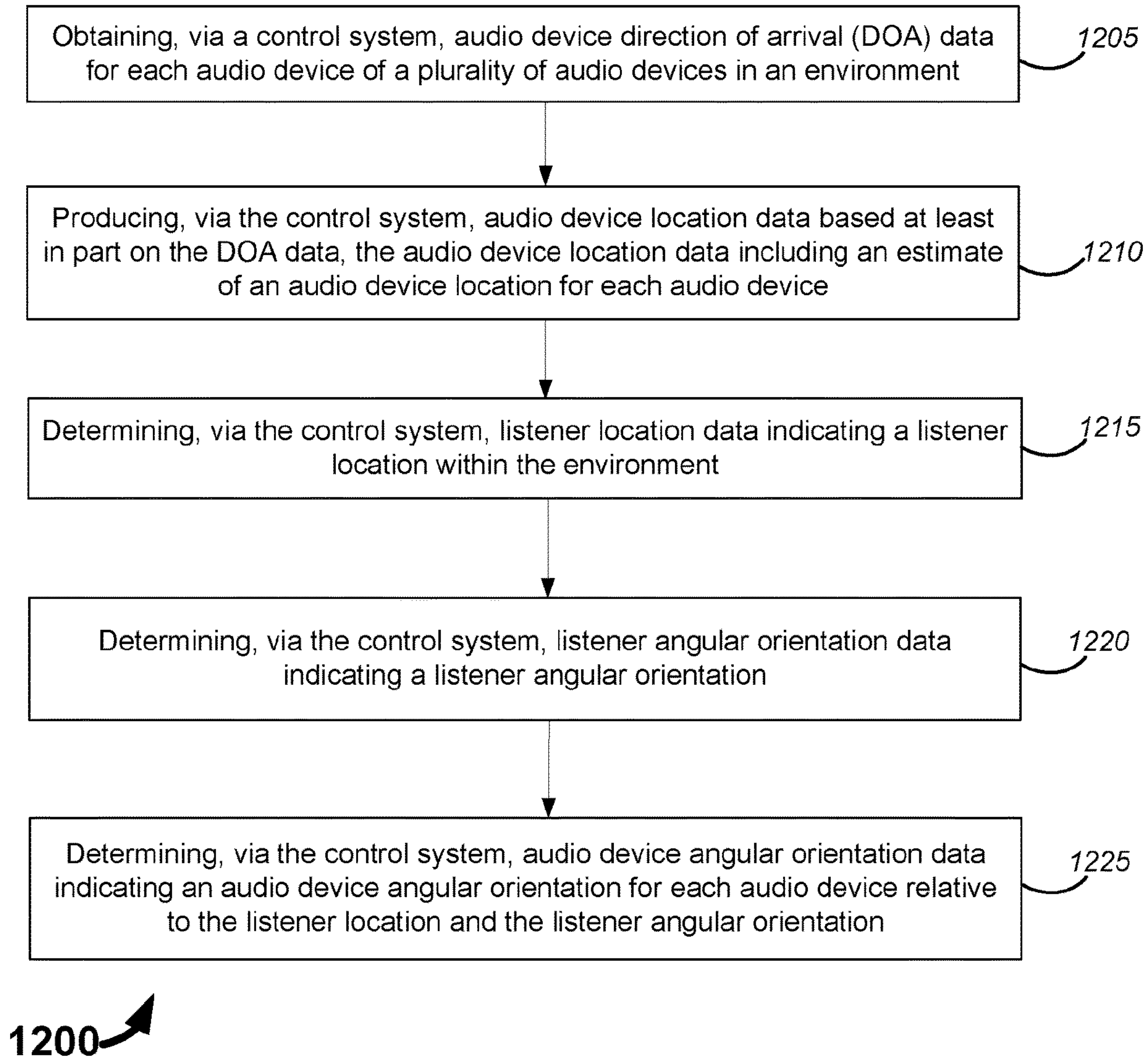
FIG. 12 is a flow diagram that outlines one example of a method that may be performed by an apparatus such as that shown in FIG. 11.

FIG. 12 is a flow diagram that outlines one example of a method that may be performed by an apparatus such as that shown in FIG. 11. The blocks of method 1200, like other methods described herein, are not necessarily performed in the order indicated. Moreover, such methods may include more or fewer blocks than shown and/or described. In this example, the blocks of method 1200 are performed by a control system, which may be (or may include) the control system 1110 shown in FIG. 11. As noted above, in some implementations the control system 1110 may reside in a single device, whereas in other implementations the control system 1110 may reside in two or more devices.

In this example, block 1205 involves obtaining direction of arrival (DOA) data for each audio device of a plurality of audio devices in an environment. In some examples, the plurality of audio devices may include all of the audio devices in an environment, such as all of the audio devices 105 shown in FIG. 1.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. In some examples, the DOA data may be obtained by controlling each loudspeaker of a plurality of loudspeakers in the environment to reproduce a test signal. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to the example shown in FIG. 12, block 1210 involves producing, via the control system, audio device location data based at least in part on the DOA data. In this example, the audio device location data includes an estimate of an audio device location for each audio device referenced in block 1205.

The audio device location data may, for example, be (or include) coordinates of a coordinate system, such as a Cartesian, spherical or cylindrical coordinate system. The coordinate system may be referred to herein as an audio device coordinate system. In some such examples, the audio device coordinate system may be oriented with reference to one of the audio devices in the environment. In other examples, the audio device coordinate system may be oriented with reference to an axis defined by a line between two of the audio devices in the environment. However, in other examples the audio device coordinate system may be oriented with reference to another part of the environment, such as a television, a wall of a room, etc.

In some examples, block 1210 may involve the processes described above with reference to FIG. 4. According to some such examples, block 1210 may involve determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix. However, in some implementations of method 1200 block 1210 may involve applying methods other than those described above with reference to FIG. 4.

In this example, block 1215 involves determining, via the control system, listener location data indicating a listener location within the environment. The listener location data may, for example, be with reference to the audio device coordinate system. However, in other examples the coordinate system may be oriented with reference to the listener or to a part of the environment, such as a television, a wall of a room, etc.

In some examples, block 1215 may involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, block 1215 may involve a triangulation process. For example, block 1215 may involve triangulating the user's voice by finding the point of intersection between DOA vectors passing through the audio devices, e.g., as described below with reference to FIG. 13A. According to some implementations, block 1215 (or another operation of the method 1200) may involve co-locating the origins of the audio device coordinate system and the listener coordinate system, which is after the listener location is determined. Co-locating the origins of the audio device coordinate system and the listener coordinate system may involve transforming the audio device locations from the audio device coordinate system to the listener coordinate system.

According to this implementation, block 1220 involves determining, via the control system, listener angular orientation data indicating a listener angular orientation. The listener angular orientation data may, for example, be made with reference to a coordinate system that is used to represent the listener location data, such as the audio device coordinate system. In some such examples, the listener angular orientation data may be made with reference to an origin and/or an axis of the audio device coordinate system.

However, in some implementations the listener angular orientation data may be made with reference to an axis defined by the listener location and another point in the environment, such as a television, an audio device, a wall, etc. In some such implementations, the listener location may be used to define the origin of a listener coordinate system. The listener angular orientation data may, in some such examples, be made with reference to an axis of the listener coordinate system.

Various methods for performing block 1220 are disclosed herein. According to some examples, the listener angular orientation may correspond to a listener viewing direction. In some such examples the listener viewing direction may be inferred with reference to the listener location data, e.g., by assuming that the listener is viewing a particular object, such as a television. In some such implementations, the listener viewing direction may be determined according to the listener location and a television location. Alternatively, or additionally, the listener viewing direction may be determined according to the listener location and a television soundbar location.

However, in some examples the listener viewing direction may be determined according to listener input. According to some such examples, the listener input may include inertial sensor data received from a device held by the listener. The listener may use the device to point at location in the environment, e.g., a location corresponding with a direction in which the listener is facing. For example, the listener may use the device to point to a sounding loudspeaker (a loudspeaker that is reproducing a sound). Accordingly, in such examples the inertial sensor data may include inertial sensor data corresponding to the sounding loudspeaker.

In some such instances, the listener input may include an indication of an audio device selected by the listener. The indication of the audio device may, in some examples, include inertial sensor data corresponding to the selected audio device.

However, in other examples the indication of the audio device may be made according to one or more utterances of the listener (e.g., "the television is in front of me now."

"speaker 2 is in front of me now," etc.). Other examples of determining listener angular orientation data according to one or more utterances of the listener are described below.

According to the example shown in FIG. 12, block 1225 involves determining, via the control system, audio device angular orientation data indicating an audio device angular orientation for each audio device relative to the listener location and the listener angular orientation. According to some such examples, block 1225 may involve a rotation of audio device coordinates around a point defined by the listener location. In some implementations, block 1225 may involve a transformation of the audio device location data from an audio device coordinate system to a listener coordinate system. Some examples are described below.

Figure 13A:
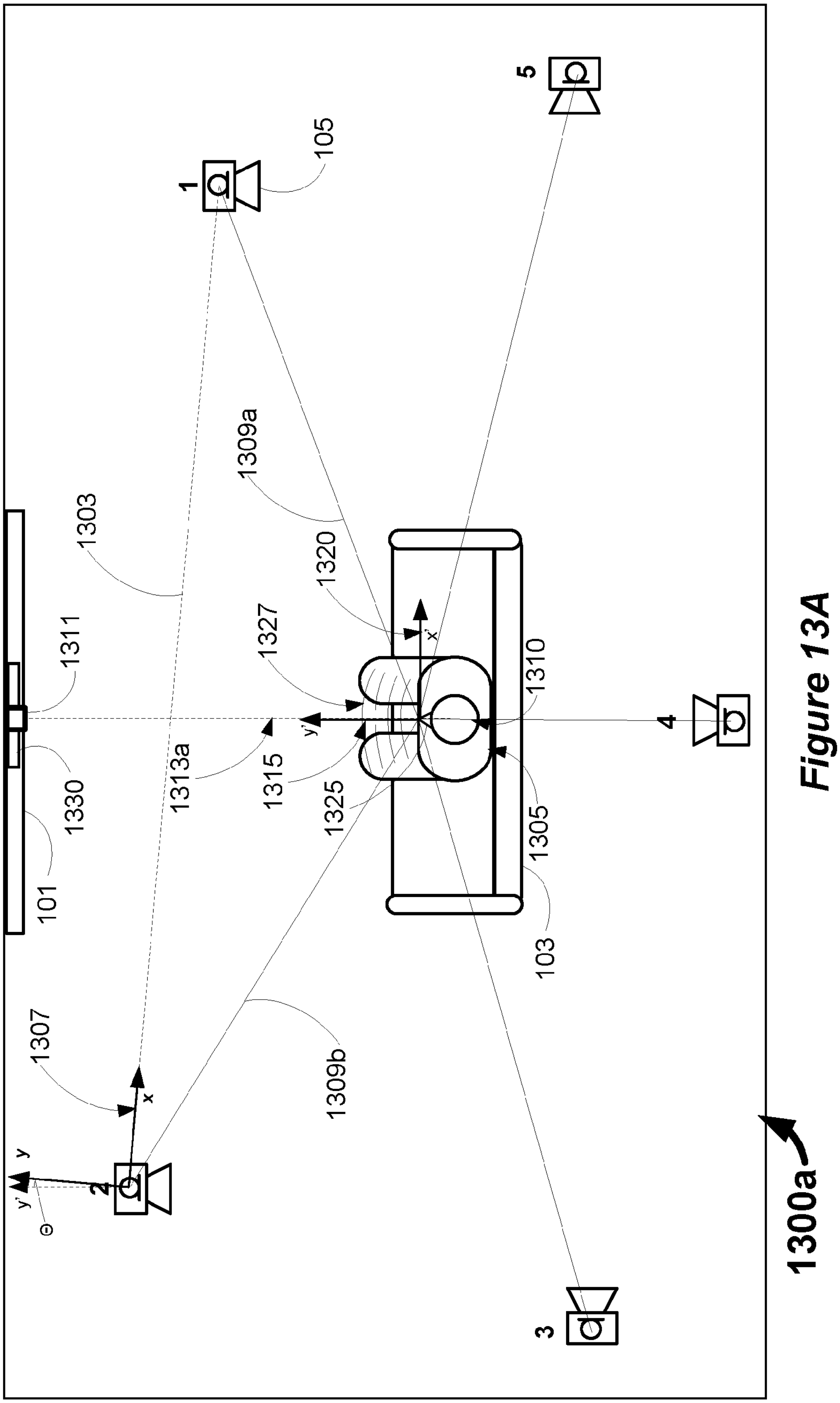
FIG. 13A shows examples of some blocks of FIG. 12.

FIG. 13A shows examples of some blocks of FIG. 12. According to some such examples, the audio device location data includes an estimate of an audio device location for each of audio devices 1-5, with reference to the audio device coordinate system 1307. In this implementation, the audio device coordinate system 1307 is a Cartesian coordinate system having the location of the microphone of audio device 2 as its origin. Here, the x axis of the audio device coordinate system 1307 corresponds with a line 1303 between the location of the microphone of audio device 2 and the location of the microphone of audio device 1.

In this example, this example, the listener location is determined by prompting the listener 1305 who is shown seated on the couch 103 (e.g., via an audio prompt from one or more loudspeakers in the environment 1300*a*) to make one or more utterances 1327 and estimating the listener location according to time-of-arrival (TOA) data. The TOA data corresponds to microphone data obtained by a plurality of microphones in the environment. In this example, the microphone data corresponds with detections of the one or more utterances 1327 by the microphones of at least some (e.g., 3, 4 or all 5) of the audio devices 1-5.

Alternatively, or additionally, the listener location according to DOA data provided by the microphones of at least some (e.g., 2, 3, 4 or all 5) of the audio devices 1-5. According to some such examples, the listener location may be determined according to the intersection of lines 1309*a*, 1309*b*, etc., corresponding to the DOA data.

According to this example, the listener location corresponds with the origin of the listener coordinate system 1320. In this example, the listener angular orientation data is indicated by the y' axis of the listener coordinate system 1320, which corresponds with a line 1313*a* between the listener's head 1310 (and/or the listener's nose 1325) and the sound bar 1330 of the television 101. In the example shown in FIG. 13A, the line 1313*a* is parallel to the y' axis. Therefore, the angle θ represents the angle between the y axis and the y' axis. In this example, block 1225 of FIG. 12 may involve a rotation by the angle θ of audio device coordinates around the origin of the listener coordinate system 1320. Accordingly, although the origin of the audio device coordinate system 1307 is shown to correspond with audio device 2 in FIG. 13A, some implementations involve co-locating the origin of the audio device coordinate system 1307 with the origin of the listener coordinate system 1320 prior to the rotation by the angle θ of audio device coordinates around the origin of the listener coordinate system 1320. This co-location may be performed by a coordinate transformation from the audio device coordinate system 1307 to the listener coordinate system 1320.

The location of the sound bar 1330 and/or the television 101 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 1330 and/or the television 101 may be determined by prompting the user to walk up to the TV and locating the user's speech by DOA and/or TOA data, which may correspond detections of the sound by the microphones of at least some (e.g., 3, 4 or all 5) of the audio devices 1-5. Such methods may involve triangulation. Such examples may be beneficial in situations wherein the sound bar 1330 and/or the television 101 has no associated microphone.

In some other examples wherein the sound bar 1330 and/or the television 101 does have an associated microphone, the location of the sound bar 1330 and/or the television 101 may be determined according to TOA or DOA methods, such as the DOA methods disclosed herein. According to some such methods, the microphone may be co-located with the sound bar 1330.

According to some implementations, the sound bar 1330 and/or the television 101 may have an associated camera 1311. A control system may be configured to capture an image of the listener's head 1310 (and/or the listener's nose 1325). In some such examples, the control system may be configured to determine a line 1313*a* between the listener's head 1310 (and/or the listener's nose 1325) and the camera 1311. The listener angular orientation data may correspond with the line 1313*a*. Alternatively, or additionally, the control system may be configured to determine an angle θ between the line 1313*a* and the y axis of the audio device coordinate system.

Figure 13B:
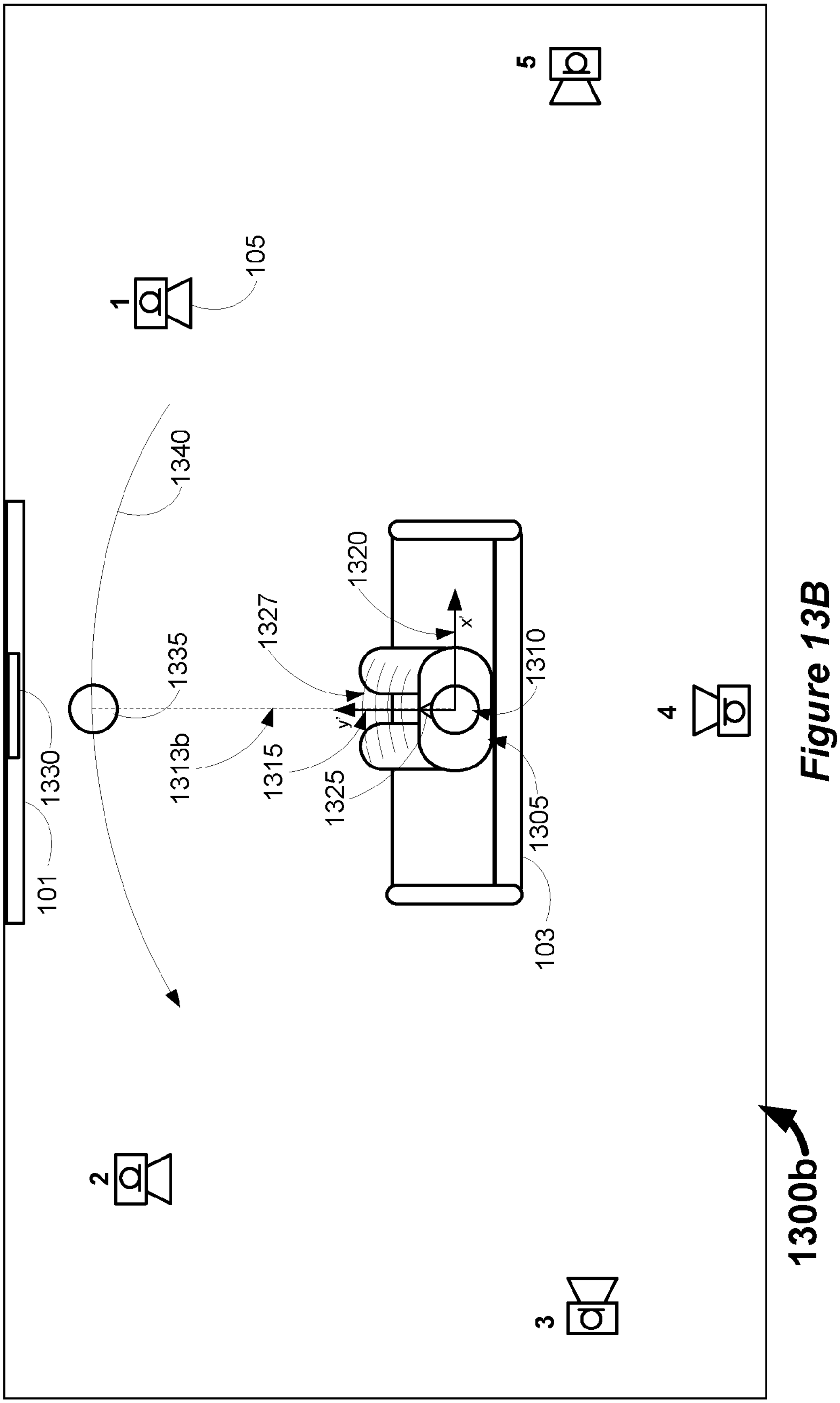
FIG. 13B shows an additional example of determining listener angular orientation data.

FIG. 13B shows an additional example of determining listener angular orientation data. According to this example, the listener location has already been determined in block 1215 of FIG. 12. Here, a control system is controlling loudspeakers of the environment 1300*b* to render the audio object 1335 to a variety of locations within the environment 1300*b*. In some such examples, the control system may cause the loudspeakers to render the audio object 1335 such that the audio object 1335 seems to rotate around the listener 1305, e.g., by rendering the audio object 1335 such that the audio object 1335 seems to rotate around the origin of the listener coordinate system 1320. In this example, the curved arrow 1340 shows a portion of the trajectory of the audio object 1335 as it rotates around the listener 1305.

According to some such examples, the listener 1305 may provide user input (e.g., saying "Stop") indicating when the audio object 1335 is in the direction that the listener 1305 is facing. In some such examples, the control system may be configured to determine a line 1313*b* between the listener location and the location of the audio object 1335. In this example, the line 1313*b* corresponds with the y' axis of the listener coordinate system, which indicates the direction that the listener 1305 is facing. In alternative implementations, the listener 1305 may provide user input indicating when the audio object 1335 is in the front of the environment, at a TV location of the environment, at an audio device location, etc.

Figure 13C:
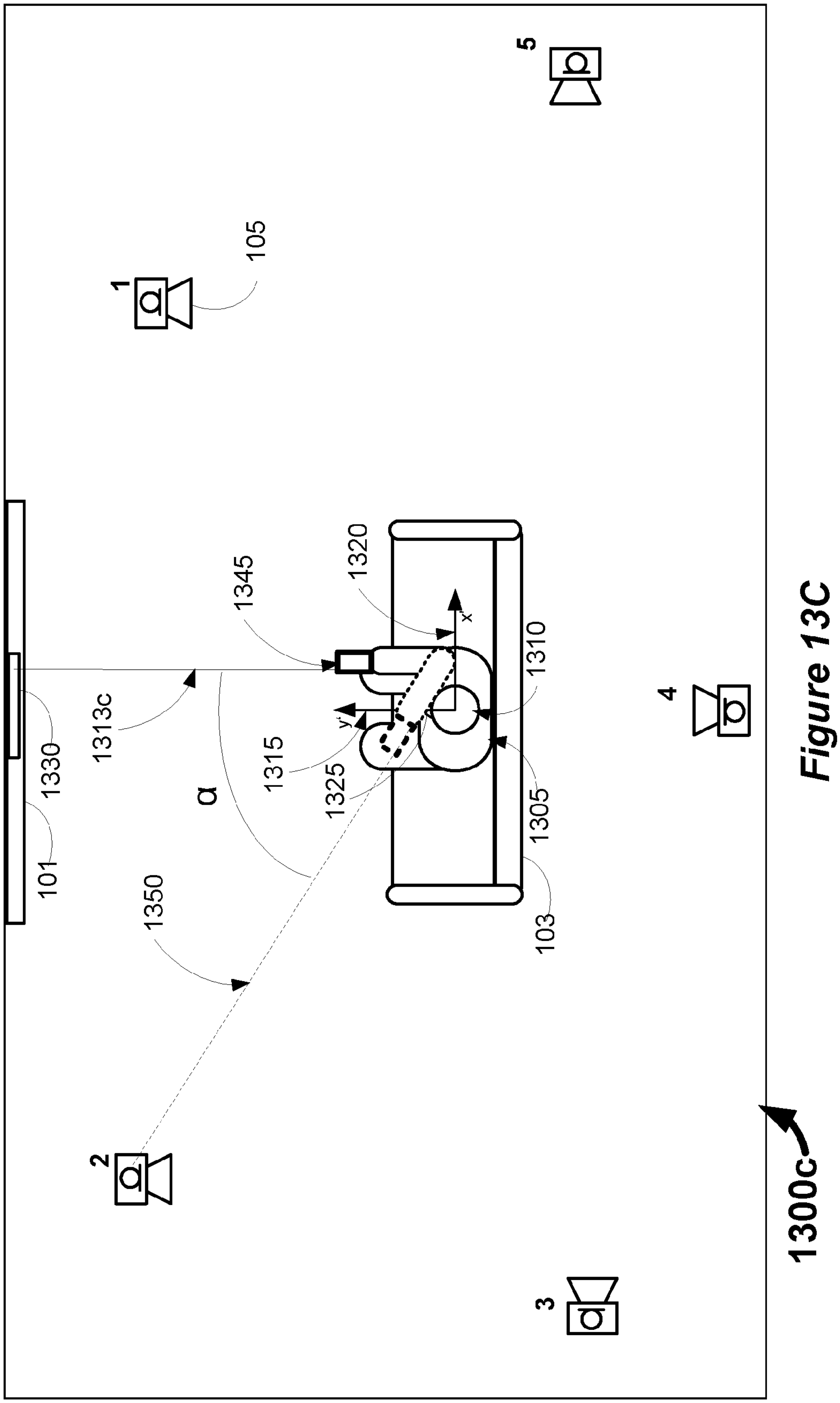
FIG. 13C shows an additional example of determining listener angular orientation data.

FIG. 13C shows an additional example of determining listener angular orientation data. According to this example, the listener location has already been determined in block 1215 of FIG. 12. Here, the listener 1305 is using a handheld device 1345 to provide input regarding a viewing direction of the listener 1305, by pointing the handheld device 1345 towards the television 101 or the soundbar 1330. The dashed outline of the handheld device 1345 and the listener's arm indicate that at a time prior to the time at which the listener 1305 was pointing the handheld device 1345 towards the television 101 or the soundbar 1330, the listener 1305 was pointing the handheld device 1345 towards audio device 2 in this example. In other examples, the listener 1305 may have pointed the handheld device 1345 towards another audio device, such as audio device 1. According to this example, the handheld device 1345 is configured to determine an angle α between audio device 2 and the television 101 or the soundbar 1330, which approximates the angle between audio device 2 and the viewing direction of the listener 1305.

The handheld device 1345 may, in some examples, be a cellular telephone that includes an inertial sensor system and a wireless interface configured for communicating with a control system that is controlling the audio devices of the environment 1300*c*. In some examples, the handheld device 1345 may be running an application or "app" that is configured to control the handheld device 1345 to perform the necessary functionality, e.g., by providing user prompts (e.g., via a graphical user interface), by receiving input indicating that the handheld device 1345 is pointing in a desired direction, by saving the corresponding inertial sensor data and/or transmitting the corresponding inertial sensor data to the control system that is controlling the audio devices of the environment 1300*c*, etc.

According to this example, a control system (which may be a control system of the handheld device 1345 or a control system that is controlling the audio devices of the environment 1300*c*) is configured to determine the orientation of lines 1313*c* and 1350 according to the inertial sensor data, e.g., according to gyroscope data. In this example, the line 1313*c* is parallel to the axis y' and may be used to determine the listener angular orientation. According to some examples, a control system may determine an appropriate rotation for the audio device coordinates around the origin of the listener coordinate system 1320 according to the angle α between audio device 2 and the viewing direction of the listener 1305.

Figure 13D:
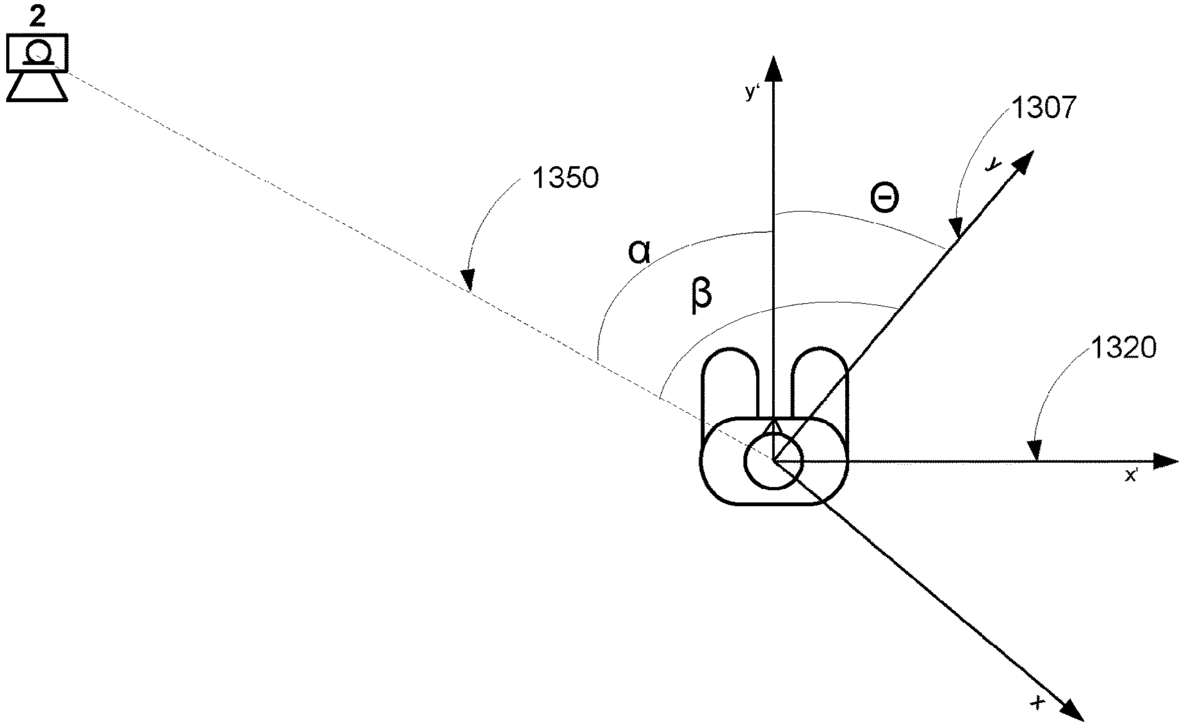
FIG. 13D shows one example of determine an appropriate rotation for the audio device coordinates in accordance with the method described with reference to FIG. 13C.

FIG. 13D shows one example of determine an appropriate rotation for the audio device coordinates in accordance with the method described with reference to FIG. 13C. In this example, the origin of the audio device coordinate system 1307 is co-located with the origin of the listener coordinate system 1320. Co-locating the origins of the audio device coordinate system 1307 and the listener coordinate system 1320 is made possible after the process of 1215, wherein the listener location is determined. Co-locating the origins of the audio device coordinate system 1307 and the listener coordinate system 1320 may involve transforming the audio device locations from the audio device coordinate system 1307 to the listener coordinate system 1320. The angle α has been determined as described above with reference to FIG. 13C. Accordingly, the angle α corresponds with the desired orientation of the audio device 2 in the listener coordinate system 1320. In this example, the angle β corresponds with the orientation of the audio device 2 in the audio device coordinate system 1307. The angle θ, which is β-α in this example, indicates the necessary rotation to align the y axis of the of the audio device coordinate system 1307 with the y' axis of the listener coordinate system 1320.

In some implementations, the method of FIG. 12 may involve controlling at least one of the audio devices in the environment based at least in part on a corresponding audio device location, a corresponding audio device angular orientation, the listener location data and the listener angular orientation data.

For example, some implementations may involve providing the audio device location data, the audio device angular orientation data, the listener location data and the listener angular orientation data to an audio rendering system. In some examples, the audio rendering system may be implemented by a control system, such as the control system 1110 of FIG. 11. Some implementations may involve controlling an audio data rendering process based, at least in part, on the audio device location data, the audio device angular orientation data, the listener location data and the listener angular orientation data. Some such implementations may involve providing loudspeaker acoustic capability data to the rendering system. The loudspeaker acoustic capability data may correspond to one or more loudspeakers of the environment. The loudspeaker acoustic capability data may indicate an orientation of one or more drivers, a number of drivers or a driver frequency response of one or more drivers. In some examples, the loudspeaker acoustic capability data may be retrieved from a memory and then provided to the rendering system.

Existing flexible rendering techniques include Center of Mass Amplitude Panning (CMAP) and Flexible Virtualization (FV). From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g)=C_{spatial}(g,\vec{o},\{\vec{s}_i\})+C_{proximity}(g,\vec{o},\{\vec{s}_i\}) \tag{1}$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt}=\min_g C(g,\vec{o},\{\vec{s}_i\}) \tag{2a}$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt}=\frac{g_{opt}}{\|g_{opt}\|} \tag{2b}$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \quad (3)$$

Equation 3 is then manipulated into a spatial cost representing the squared error between the desired audio position and that produced by the activated loudspeakers:

$$C_{spatial}(g,\vec{o},\{\vec{s}_i\})=\|(\Sigma_{i=1}^{M} g_i)\vec{o}-\Sigma_{i=1}^{M} g_i \vec{s}_i\|^2=\|\Sigma_{i=1}^{M} g_i(\vec{o}-\vec{s}_i)\|^2 \quad (4)$$

With FV, the spatial term of the cost function is defined differently. There the goal is to produce a binaural response b corresponding to the audio object position oat the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b=\mathrm{HRTF}\{\vec{o}\} \quad (5)$$

At the same time, the 2×1 binaural response e produced at the listener's ears by the loudspeakers is modelled as a 2×M acoustic transmission matrix H multiplied with the M×1 vector g of complex speaker activation values:

$$e=Hg \quad (6)$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g,\vec{o},\{\vec{s}_i\})=(b-Hg)^*(b-Hg) \quad (7)$$

Conveniently, the spatial term of the cost function for CMAP and FV defined in Equations 4 and 7 can both be rearranged into a matrix quadratic as a function of speaker activations g:

$$C_{spatial}(g,\vec{o},\{\vec{s}_i\})=g^*Ag+Bg+C \quad (8)$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g,\vec{o},\{\vec{s}_i\})=g^*Dg \quad (9a)$$

where D is a diagonal matrix of distance penalties between the desired audio position and each speaker:

$$D=\begin{bmatrix} d_1 & \dots & 0 \\ \vdots & \ddots & \vdots \\ 0 & \dots & d_M \end{bmatrix},\ d_i=\mathrm{distance}(\vec{o},\vec{s}_i) \quad (9b)$$

The distance penalty function can take on many forms, but the following is a useful parameterization $$\mathrm{distance}(\vec{o},\vec{s}_i)=\alpha d_0^2\left(\frac{\|\vec{o}-\vec{s}_i\|}{d_0}\right)^{\beta} \quad (9c)$$

where $\|\vec{o}-\vec{s}_i\|$ is the Euclidean distance between the desired audio position and speaker position and α and β are tunable parameters. The parameter α indicates the global strength of the penalty; $d_0$ corresponds to the spatial extent of the distance penalty (loudspeakers at a distance around $d_0$ or further away will be penalized), and β accounts for the abruptness of the onset of the penalty at distance $d_0$.

Combining the two terms of the cost function defined in Equations 8 and 9a yields the overall cost function $$C(g)=g^*Ag+Bg+C+g^*Dg=g^*(A+D)g+Bg+C \quad (10)$$

Setting the derivative of this cost function with respect to g equal to zero and solving for g yields the optimal speaker activation solution:

$$g_{opt}=\frac{1}{2}(A+D)^{-1}B \quad (11)$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Figure 14:
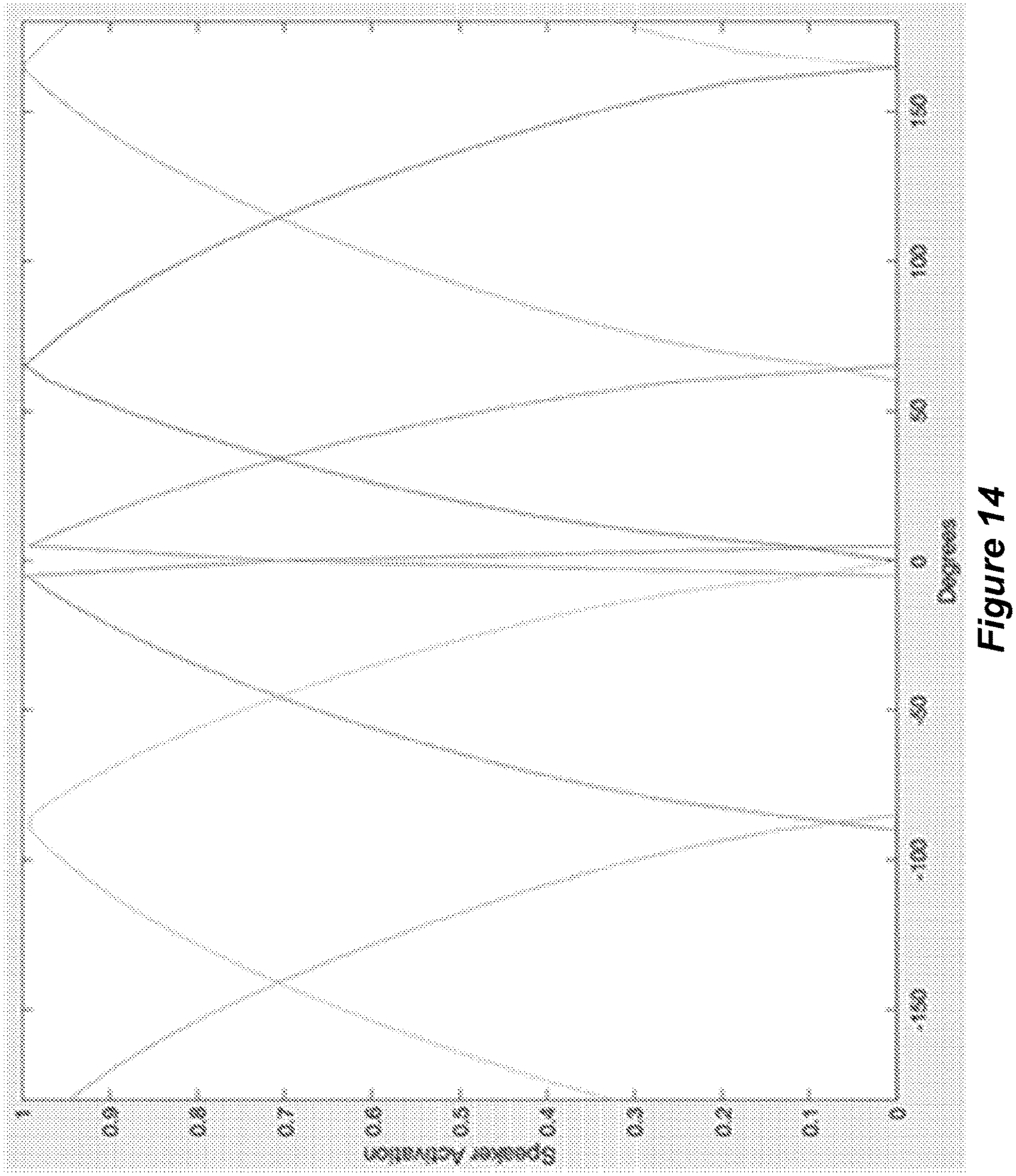
FIG. 14 shows the speaker activations which comprise the optimal solution to Equation 11 for these particular speaker positions.
Figure 15:
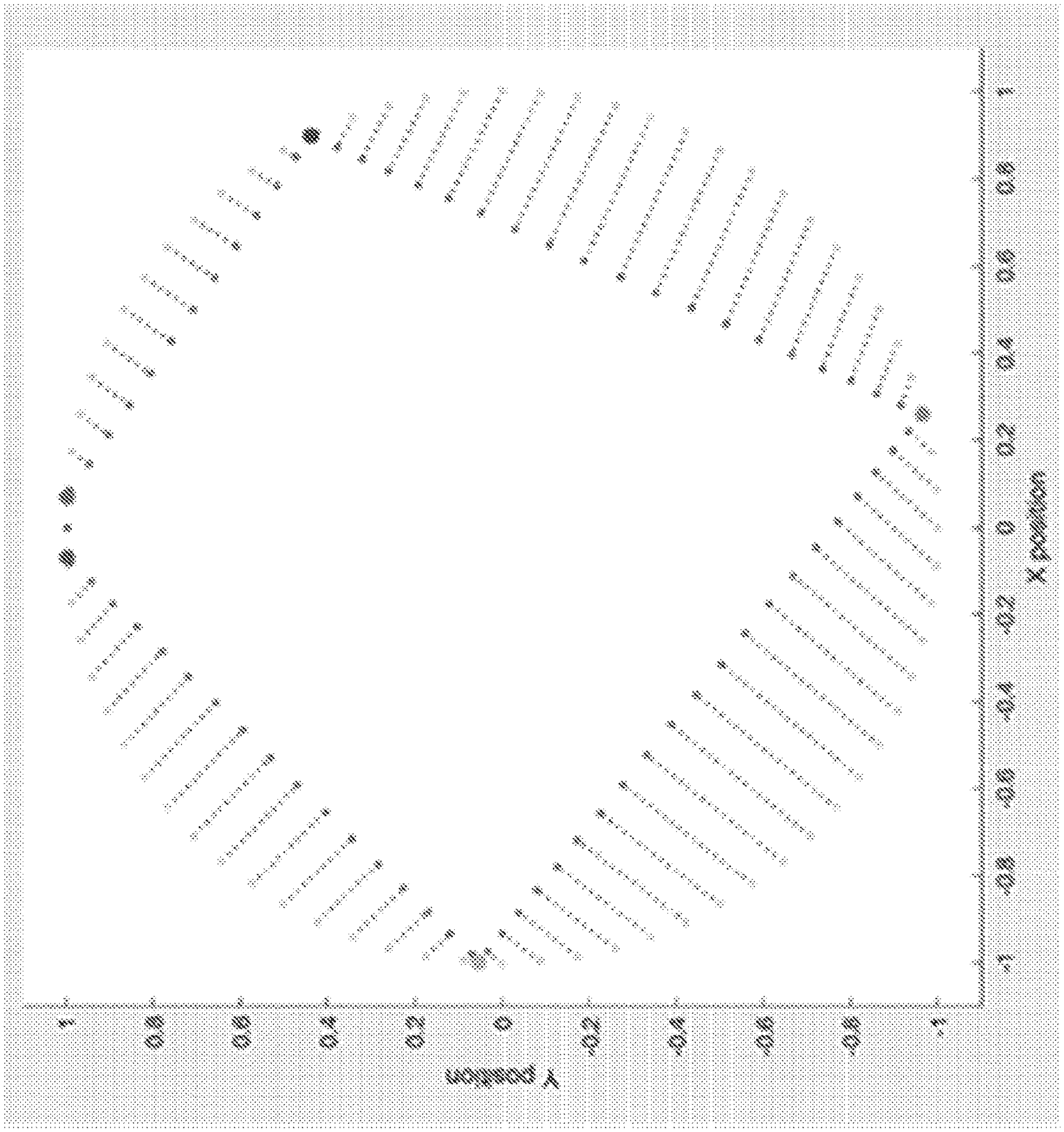
FIG. 15 plots the individual speaker positions for which the speaker activations are shown in FIG. 14.

FIGS. 14 and 15 are diagrams which illustrate an example set of speaker activations and object rendering positions, given the speaker positions of 4, 64, 165, −87, and −4 degrees. FIG. 14 shows the speaker activations which comprise the optimal solution to Equation 11 for these particular speaker positions. FIG. 15 plots the individual speaker positions as orange, purple, green, gold, and blue dots respectively. FIG. 15 also shows ideal object positions (i.e., positions at which audio objects are to be rendered) for a multitude of possible object angles as green dots and the corresponding actual rendering positions for those objects as red dots, connected to the ideal object positions by dotted black lines.

While specific embodiments and applications of the disclosure have been described herein, it will be apparent to those of ordinary skill in the art that many variations on the embodiments and applications described herein are possible without departing from the scope of this disclosure.

Various aspects of the present disclosure may be appreciated from the following enumerated example embodiments (EEEs):

1. An audio device location method, comprising:

obtaining direction of arrival (DOA) data for each audio device of a plurality of audio devices;

determining interior angles for each of a plurality of triangles based on the DOA data, each triangle of the plurality of triangles having vertices that correspond with audio device locations of three of the audio devices;

determining a side length for each side of each of the triangles based, at least in part, on the interior angles;

performing a forward alignment process of aligning each of the plurality of triangles in a first sequence, to produce a forward alignment matrix;

performing a reverse alignment process of aligning each of the plurality of triangles in a second sequence that is the reverse of the first sequence, to produce a reverse alignment matrix; and producing a final estimate of each audio device location based, at least in part, on values of the forward alignment matrix and values of the reverse alignment matrix.

2. The method of EEE 1, wherein producing the final estimate of each audio device location comprises:

translating and scaling the forward alignment matrix to produce a translated and scaled forward alignment matrix; and translating and scaling the reverse alignment matrix to produce a translated and scaled reverse alignment matrix.

3. The method of EEE 2, wherein producing the final estimate of each audio device location further comprises producing a rotation matrix based on the translated and scaled forward alignment matrix and the translated and scaled reverse alignment matrix, the rotation matrix including a plurality of estimated audio device locations for each audio device.

4. The method of EEE 3, wherein producing the rotation matrix comprises performing a singular value decomposition on the translated and scaled forward alignment matrix and the translated and scaled reverse alignment matrix.

5. The method of EEE 3 or EEE 4, wherein producing the final estimate of each audio device location further comprises averaging the estimated audio device locations for each audio device to produce the final estimate of each audio device location.

6. The method of any one of EEEs 1-5, wherein determining the side length involves:

determining a first length of a first side of a triangle; and determining lengths of a second side and a third side of the triangle based on the interior angles of the triangle.

7. The method of EEE 6, wherein determining the first length involves setting the first length to a predetermined value.

8. The method of EEE 6, wherein determining the first length is based on at least one of time-of-arrival data or received signal strength data.

9. The method of any one of EEEs 1-8, wherein obtaining the DOA data involves determining the DOA data for at least one audio device of the plurality of audio devices.

10. The method of EEE 9, wherein determining the DOA data involves receiving microphone data from each microphone of a plurality of audio device microphones corresponding to a single audio device of the plurality of audio devices and determining the DOA data for the single audio device based, at least in part, on the microphone data.

11. The method of EEE 9, wherein determining the DOA data involves receiving antenna data from one or more antennas corresponding to a single audio device of the plurality of audio devices and determining the DOA data for the single audio device based, at least in part, on the antenna data.

12. The method of any one of EEEs 1-11, further comprising controlling at least one of the audio devices based, at least in part, on the final estimate of at least one audio device location.

13. The method of EEE 12, wherein controlling at least one of the audio devices involves controlling a loudspeaker of at least one of the audio devices.

14. An apparatus configured to perform the method of any one of EEEs 1-13.

15. One or more non-transitory media having software recorded thereon, the software including instructions for controlling one or more devices to perform the method of any one of EEEs 1-13.

16. An audio device configuration method, comprising:

obtaining, via a control system, audio device direction of arrival (DOA) data for each audio device of a plurality of audio devices in an environment;

producing, via the control system, audio device location data based at least in part on the DOA data, the audio device location data including an estimate of an audio device location for each audio device;

determining, via the control system, listener location data indicating a listener location within the environment;

determining, via the control system, listener angular orientation data indicating a listener angular orientation; and determining, via the control system, audio device angular orientation data indicating an audio device angular orientation for each audio device relative to the listener location and the listener angular orientation.

17. The method of EEE 16, further comprising controlling at least one of the audio devices based at least in part on a corresponding audio device location, a corresponding audio device angular orientation, the listener location data and the listener angular orientation data.

18. The method of EEE 16, further comprising providing the audio device location data, the audio device angular orientation data, the listener location data and the listener angular orientation data to an audio rendering system.

19. The method of EEE 16, further comprising controlling an audio data rendering process based, at least in part, on the audio device location data, the audio device angular orientation data, the listener location data and the listener angular orientation data.

20. The method of any one of EEEs 16-19, wherein obtaining the DOA data involves controlling each loudspeaker of a plurality of loudspeakers in the environment to reproduce a test signal.

21. The method of any one of EEEs 16-20, wherein at least one of the listener location data or the listener angular orientation data is based on DOA data corresponding to one or more utterances of the listener.

22. The method of any one of EEEs 16-21, wherein the listener angular orientation corresponds to a listener viewing direction.

23. The method of EEE 22, wherein the listener viewing direction is determined according to the listener location and a television location.

24. The method of EEE 22, wherein the listener viewing direction is determined according to the listener location and a television soundbar location.

25. The method of EEE 22, wherein the listener viewing direction is determined according to listener input.

26. The method of EEE 25, wherein the listener input includes inertial sensor data received from a device held by the listener.

27. The method of EEE 25, wherein the inertial sensor data includes inertial sensor data corresponding to a sounding loudspeaker.

28. The method of EEE 25, wherein the listener input includes an indication of an audio device selected by the listener.

29. The method of any one of EEEs 16-28, further comprising providing loudspeaker acoustic capability data to a rendering system, the loudspeaker acoustic capability data indicating at least one of an orientation of one or more drivers, a number of drivers or a driver frequency response of one or more drivers.

30. The method of any one of EEEs 16-29, wherein producing the audio device location data comprises:

determining interior angles for each of a plurality of triangles based on the audio device DOA data, each triangle of the plurality of triangles having vertices that correspond with audio device locations of three of the audio devices;

determining a side length for each side of each of the triangles based, at least in part, on the interior angles;

performing a forward alignment process of aligning each of the plurality of triangles in a first sequence, to produce a forward alignment matrix;

performing a reverse alignment process of aligning each of the plurality of triangles in a second sequence that is the reverse of the first sequence, to produce a reverse alignment matrix; and producing a final estimate of each audio device location based, at least in part, on values of the forward alignment matrix and values of the reverse alignment matrix.

31. An apparatus configured to perform the method of any one of EEEs 16-30.

32. One or more non-transitory media having software recorded thereon, the software including instructions for controlling one or more devices to perform the method of any one of EEEs 16-30.

The invention claimed is:

1. A method of determining a location of a plurality of at least four audio devices in an environment, each audio device configured to detect signals produced by a different audio device of the plurality of audio devices, the method comprising:

obtaining, by a control system, direction of arrival (DOA) data for each audio device of the plurality of at least four audio devices, the DOA data being based on a detected direction of the signals produced by another audio device of the plurality of audio devices in the environment;

determining, by the control system, interior angles for each of a plurality of triangles based on the DOA data, each triangle of the plurality of triangles having vertices that correspond with locations of three of the plurality of audio devices;

determining, by the control system, a side length for each side of each of the triangles based on the interior angles and on the signals produced by the audio devices separated by the side length to be determined, or determining, by the control system, the side length based on the interior angles, wherein one side length of one of the triangles is set to a predetermined value;

performing, by the control system, a forward alignment process of aligning each of the plurality of triangles in a first sequence, to produce a forward alignment matrix, wherein the forward alignment process is performed by forcing a side length of each triangle to coincide with a side length of an adjacent triangle and using the interior angles determined for the adjacent triangle;

performing, by the control system, a reverse alignment process of aligning each of the plurality of triangles, to produce a reverse alignment matrix, wherein the reverse alignment process is performed as the forward alignment process but in a second sequence that is the reverse of the first sequence; and producing, by the control system, a final estimate of each audio device location based, at least in part, on values of the forward alignment matrix and values of the reverse alignment matrix.

2. The method of claim 1, wherein producing the final estimate of each audio device location comprises:

translating and scaling the forward alignment matrix to produce a translated and scaled forward alignment matrix; and translating and scaling the reverse alignment matrix to produce a translated and scaled reverse alignment matrix, wherein translating and scaling the forwards and reverse alignment matrices comprise moving the centroids of the respective matrices to the origin and forcing the Frobenius norm of each matrix to one.

3. The method of claim 2, wherein producing the final estimate of each audio device location further comprises producing a further matrix based on the translated and scaled forward alignment matrix and the translated and scaled reverse alignment matrix, the further matrix including a plurality of estimated audio device locations for each audio device.

4. The method of claim 3, wherein producing the further matrix comprises performing a singular value decomposition on the translated and scaled forward alignment matrix and the translated and scaled reverse alignment matrix.

5. The method of claim 1, wherein producing the final estimate of each audio device location further comprises averaging multiple estimates of the location of the audio device obtained from overlapping vertices of multiple triangles.

6. The method of claim 1, wherein determining the side length involves:

determining a first length of a first side of a triangle; and determining lengths of a second side and a third side of the triangle based on the interior angles of the triangle, wherein determining the first length involves setting the first length to a predetermined value or wherein determining the first length is based on at least one of time-of-arrival data or received signal strength data.

7. The method of claim 1, wherein each audio device comprises a plurality of audio device microphones and wherein determining the direction of arrival data involves receiving microphone data from each microphone of a plurality of audio device microphones corresponding to a single audio device of the plurality of audio devices and determining the direction of arrival data for the single audio device based, at least in part, on the microphone data.

8. The method of claim 1, wherein each audio device comprises one or more antennas and wherein determining the direction of arrival data involves receiving antenna data from one or more antennas corresponding to a single audio device of the plurality of audio devices and determining the direction of arrival data for the single audio device based, at least in part, on the antenna data.

9. The method of claim 1, further comprising controlling at least one of the audio devices based, at least in part, on the final estimate of at least one audio device location, wherein each audio device of the plurality of audio devices comprises a loudspeaker, and wherein controlling at least one of the audio devices involves controlling a loudspeaker of at least one of the audio devices.

10. The method of claim 1, further comprising:
receiving, by the control system, audio data;
rendering, by the control system, the audio data based, at least in part, on the final estimate of each audio device location, to produce rendered audio signals; and
providing, by the control system, the rendered audio signals to the plurality of at least four audio devices in the environment.

11. An apparatus, comprising:
an interface system; and
a control system configured to:
obtain direction of arrival (DOA) data for each audio device of the plurality of at least four audio devices, the DOA data being based on a detected direction of the signals produced by another audio device of the plurality of audio devices in the environment;
determine interior angles for each of a plurality of triangles based on the DOA data, each triangle of the plurality of triangles having vertices that correspond with locations of three of the plurality of audio devices;
determine a side length for each side of each of the triangles based on the interior angles and on the signals produced by the audio devices separated by the side length to be determined, or
determine the side length based on the interior angles, wherein one side length of one of the triangles is set to a predetermined value;
perform a forward alignment process of aligning each of the plurality of triangles in a first sequence, to produce a forward alignment matrix, wherein the forward alignment process is performed by forcing a side length of each triangle to coincide with a side length of an adjacent triangle and using the interior angles determined for the adjacent triangle;
perform a reverse alignment process of aligning each of the plurality of triangles, to produce a reverse alignment matrix, wherein the reverse alignment process is performed as the forward alignment process but in a second sequence that is the reverse of the first sequence; and
produce a final estimate of each audio device location based, at least in part, on values of the forward alignment matrix and values of the reverse alignment matrix.

12. One or more non-transitory computer-readable mediums having instructions stored thereon for controlling one or more devices to perform a method, the method comprising:
obtaining direction of arrival (DOA) data for each audio device of a plurality of at least four audio devices, the DOA data being based on a detected direction of the signals produced by another audio device of the plurality of audio devices in the environment;
determining interior angles for each of a plurality of triangles based on the DOA data, each triangle of the plurality of triangles having vertices that correspond with locations of three of the plurality of audio devices;
determining a side length for each side of each of the triangles based on the interior angles and on the signals produced by the audio devices separated by the side length to be determined, or
determining the side length based on the interior angles, wherein one side length of one of the triangles is set to a predetermined value;
performing a forward alignment process of aligning each of the plurality of triangles in a first sequence, to produce a forward alignment matrix, wherein the forward alignment process is performed by forcing a side length of each triangle to coincide with a side length of an adjacent triangle and using the interior angles determined for the adjacent triangle;
performing a reverse alignment process of aligning each of the plurality of triangles, to produce a reverse alignment matrix, wherein the reverse alignment process is performed as the forward alignment process but in a second sequence that is the reverse of the first sequence; and
producing a final estimate of each audio device location based, at least in part, on values of the forward alignment matrix and values of the reverse alignment matrix.

13. The apparatus of claim 11, wherein the control system comprises a general purpose single- or multi-chip processor, a digital signal processor (DSP), an application specific integrated circuit (ASIC), a field programmable gate array (FPGA) or other programmable logic device, discrete gate or transistor logic, discrete hardware components, or combinations thereof.

14. The apparatus of claim 11, wherein the apparatus is an audio device that comprises a microphone system and a speaker system.

15. The apparatus of claim 11, wherein the apparatus comprises a server.

16. The one or more non-transitory and computer-readable media of claim 12, wherein the one or more devices include an audio device that comprises a microphone system and a speaker system.

17. The one or more non-transitory and computer-readable media of claim 12, wherein the one or more devices include a server.

* * * * *